(12) United States Patent
Harada et al.

(10) Patent No.: US 9,297,979 B2
(45) Date of Patent: Mar. 29, 2016

(54) LENS DRIVING DEVICE AND OPTICAL DISC APPARATUS

(71) Applicant: FUNAI ELECTRIC CO., LTD., Osaka (JP)

(72) Inventors: Kazuya Harada, Osaka (JP); Tetsuo Nishidate, Osaka (JP); Toyoshi Nogami, Osaka (JP); Hiromasa Sasaoka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/938,326

(22) Filed: Jul. 10, 2013

(65) Prior Publication Data

US 2014/0016449 A1    Jan. 16, 2014

(30) Foreign Application Priority Data

Jul. 12, 2012  (JP) ................................. 2012-156653
Sep. 13, 2012  (JP) ................................. 2012-201105
Sep. 13, 2012  (JP) ................................. 2012-201106
Jul. 3, 2013  (JP) ................................. 2013-139802

(51) Int. Cl.
*G02B 7/09* (2006.01)
*G11B 20/10* (2006.01)
*G11B 7/1378* (2012.01)
*G11B 7/1392* (2012.01)
*G11B 7/1376* (2012.01)
*G11B 7/22* (2006.01)

(52) U.S. Cl.
CPC ............... *G02B 7/09* (2013.01); *G11B 7/1376* (2013.01); *G11B 7/1378* (2013.01); *G11B 7/13925* (2013.01); *G11B 7/22* (2013.01); *G11B 20/10388* (2013.01)

(58) Field of Classification Search
CPC ............ G11B 7/13927; G11B 19/046; G11B 2007/0006; G11B 20/10009; G11B 20/10388; G11B 20/10509; G11B 2220/2537; G11B 7/005; G11B 7/0948; G11B 7/1275; G11B 7/1378; G11B 7/139; G11B 7/13925; G01S 7/4812; G01S 7/4817; G02B 26/0875; G02B 26/10; G02B 27/0025; G02B 7/102; G02B 21/241; G02B 27/646; G02B 7/16; G02B 7/28; G12B 5/00; G03B 2205/0015; G03B 2205/0023; G03B 2205/003; G03B 2205/0076; G03B 35/02; G03B 5/00
USPC ............ 369/53.39, 53.4, 44.23, 44.11, 44.37, 369/44.12, 44.14, 112.23; 359/819, 359/821–830, 813, 814
See application file for complete search history.

(56) References Cited

U.S. PATENT DOCUMENTS

| | | | |
|---|---|---|---|
| 6,330,095 B1 * | 12/2001 | Ozawa ........................ | 359/210.1 |
| 2002/0067553 A1 * | 6/2002 | Maeda et al. ................. | 359/719 |
| 2004/0042096 A1 * | 3/2004 | Nomura ........................ | 359/822 |
| 2009/0097383 A1 | 4/2009 | Yokota | |
| 2009/0109819 A1 * | 4/2009 | Hosoda et al. ............. | 369/53.17 |
| 2009/0123145 A1 * | 5/2009 | Nomura ........................ | 396/529 |
| 2010/0232265 A1 * | 9/2010 | Nakata et al. .............. | 369/44.15 |
| 2012/0014239 A1 * | 1/2012 | Nishigata et al. .......... | 369/53.35 |

FOREIGN PATENT DOCUMENTS

JP    2009-93762 A    4/2009

* cited by examiner

*Primary Examiner* — Dionne H Pendleton
(74) *Attorney, Agent, or Firm* — Morgan, Lewis & Bockius LLP

(57) ABSTRACT

A lens driving device includes a lens holder for holding a lens, a supporter portion for supporting the lens holder in a movable manner, a drive portion for driving the lens holder, and an elastic portion for supplying the lens holder with a force in a predetermined direction. The supporter portion includes a shaft engaging with a bearing of the lens holder, and the force in a predetermined direction includes a force in a direction perpendicular to the shaft and a force in a direction to rotate the lens holder about the shaft.

19 Claims, 15 Drawing Sheets

LENS DRIVING DEVICE AND OPTICAL DISC APPARATUS

CROSS-REFERENCE TO RELATED APPLICATIONS

This application is based on Japanese Patent Application No. 2012-156653 filed on Jul. 12, 2012, Japanese Patent Application No. 2012-201105 filed on Sep. 13, 2012, Japanese Patent Application No. 2012-201106 filed on Sep. 13, 2012, and Japanese Patent Application No. 2013-139802 filed on Jul. 3, 2013, contents of which are hereby incorporated by reference.

BACKGROUND OF THE INVENTION

1. Field of the Invention

The present invention relates to a lens driving device and to an optical disc apparatus.

2. Description of Related Art

Conventionally, there is an optical apparatus equipped with a lens driving device for driving a lens. For instance, an optical pickup may be equipped with a lens driving device for driving a movable lens such as a collimator lens in an optical axis direction for a purpose of suppressing influence of spherical aberration. Such a lens driving device is configured to include, for example, a lens holder that holds a lens, a supporter portion that supports the lens holder in a movable manner, and a drive portion that drives the lens holder.

As the supporter portion, for example, there is considered two guide shafts that penetrate the lens holder, and a guide rail on which the lens holder is placed. As a drive source for the drive portion, for example, a rotary motor such as a stepping motor may be used. In addition, in order to avoid to use an expensive stepping motor as a drive source for the drive portion, electromagnetic force generated by a magnet and a coil may be used (see, for example, JP-A-2009-93762).

SUMMARY OF THE INVENTION

In the lens driving device described above, rattling or vibration may be generated due to clearance between the lens holder and the guide shaft, for example. The rattling or the like of the lens holder causes unstableness of a lens position. For instance, in the optical pickup equipped with the lens driving device, if the lens position is unstable, there is a problem that read performance or write performance of the optical pickup is deteriorated.

In view of the above description, it is an object of the present invention to provide a lens driving device that hardly generate rattling or vibration in the lens holder. In addition, it is another object of the present invention to provide an optical disc apparatus equipped with the lens driving device so that read and write performance is hardly deteriorated.

In order to achieve the above-mentioned object, a lens driving device of the present invention includes a lens holder which holds a lens, a supporter portion which supports the lens holder in a movable manner, a drive portion which drives the lens holder, and an elastic portion which gives a force in a predetermined direction to the lens holder. The supporter portion includes a shaft which engages with a bearing of the lens holder. The force in a predetermined direction includes a force in a direction perpendicular to the shaft and a force in a direction to rotate the lens holder about the shaft (first structure).

With this structure, by a function of the elastic portion, it is possible to suppress rattling due to clearance between the lens holder and the supporter portion. In other words, the lens driving device having this structure hardly generates rattling or vibration in the lens holder.

In the lens driving device having the first structure described above, it is preferred that the supporter portion include a groove rail or a convex rail which engages a part of the lens holder (second structure). With this structure, it is possible to obtain a structure in which friction between the supporter portion and the lens holder is reduced so that the lens holder can be easily moved. Further, with this structure, it is possible to obtain a structure in which the lens holder is always pressed to the shaft and a part of the rail. Therefore, the lens driving device having this structure hardly generate rattling or vibration in the lens holder.

In the lens driving device having the first or second structure described above, it is preferred that the force in a predetermined direction further include a force in a direction parallel to the shaft (third structure). With this structure, it is easy to dispose the lens holder (lens) at a precise position.

In the lens driving device having the third structure described above, the drive portion may include a coil and a magnet for driving the lens holder by electromagnetic force, and one of the coil and the magnet is mounted on the lens holder (fourth structure). With this structure, it is not necessary to use an expensive drive source such as a stepping motor so that cost reduction of the lens driving device can be expected.

In the lens driving device having the fourth structure described above, the elastic portion may have a neutral position at which no force in the direction parallel to the shaft is applied to the lens holder, in a movable range of the lens holder (fifth structure). Further, in this structure, it is preferred that the neutral position be in a vicinity of a middle point of the movable range. With this structure, it is easy to set the lens holder (lens) quickly to a target position. In addition, it is also possible to reduce drive power necessary for driving the lens holder.

Further, in the lens driving device having any one of the first to fifth structures described above, it is preferred that the elastic portion is constituted of a coil spring. Here, the coil spring should be interpreted to include an extension coil spring (hereinafter referred to simply as an extension spring) and a compression coil spring (hereinafter referred to simply as a compression spring). Further, in this structure, it is more preferred that the elastic portion include an extension spring. With this structure, for example, the lens driving device can be easily designed.

In addition, as described above, if the elastic portion is a coil spring, the elastic portion includes a plurality of coil springs, and at least one of the coil springs is disposed diagonally to the direction parallel to the shaft. In addition, the coil spring that is disposed diagonally to the direction parallel to the shaft is disposed in a vicinity of the shaft. With this structure, it is possible to avoid a situation in which an excessive force is applied to the lens holder so that the lens holder does not smoothly move.

The lens driving device having any one of the first to fifth structures described above further includes a movement detection portion that can detect whether or not a lens supported by the lens holder has at least moved, and a correction process portion that changes a drive set value of the drive portion step by step at a predetermined timing and calculates a relationship between the drive set value of the drive portion and a movement amount of the lens on the basis of a detection result detected by the movement detection portion on the basis of the change (sixth structure). With this structure, a relationship between the drive set value of the drive portion and the movement amount of the lens (movable lens) held by the lens holder is calculated, and the movable lens position can be moved by using the calculation result. Therefore, with this structure, movable lens position accuracy can be improved by correcting a variation among devices or a variation due to an environmental change.

As a predetermined timing described above, there is a case where an environmental change is detected or a case where the lens driving device is powered on, for example. In addition, if the lens driving device is included in an optical disc apparatus, as a predetermined timing described above, there is, for example, a timing before at least one of reading (reproduction) and writing (recording) of information is performed or a case where it is determined that a position of the optical pickup is changed.

In the lens driving device having the sixth structure described above, it is preferred that the movement detection portion detects whether or not the lens has at least moved utilizing a counter electromotive force generated by drive of the drive portion (seventh structure). It is possible to adopt a structure in which a dedicated sensor is used as the movement detection portion. However, with the structure using the counter electromotive force like this structure, it is not necessary to prepare a dedicated sensor, for example. In addition, it is also not necessary to secure a space for attaching the dedicated sensor. Therefore, with this structure, cost reduction and downsizing of the device can be expected.

In the lens driving device having the sixth or seventh structure described above, it is preferred that the correction process portion calculates a linear expression that is used for determining the drive set value of the drive portion on the basis of the movable range of the lens and a detection result of the movement detection portion (eighth structure). With this structure, it is possible to complete a process of correcting variation of the movement amount of the movable lens in short time.

The lens driving device having the fourth or fifth structure described above may further include a counter electromotive force detection portion which detects a counter electromotive force generated by drive of the drive portion, and an abnormality determination portion which determines whether or not abnormality has occurred in drive of the lens held by the lens holder on the basis of the counter electromotive force detected by the counter electromotive force detection portion, a normal operation range of the lens is set narrower than the movable range of the lens, and the abnormality determination portion determines that an abnormality has occurred in drive of the lens if it is determined that the lens is not moved on the basis of the counter electromotive force despite that a drive force in the normal operation range is given by the drive portion (ninth structure). Further, in this structure, the abnormality determination portion may stop the drive of the lens if it is determined that the abnormality has occurred. With this structure, a lens drive abnormality can be detected by monitoring a predetermined counter electromotive force. Therefore, with this structure, it can be avoided to use the device in a state where an operational abnormality of the lens driving device has occurred. In addition, because a drive abnormality is detected by using the counter electromotive force in this structure, it is not necessary to add another sensor or the like for detecting a drive abnormality, and the structure is advantageous for cost reduction and downsizing. Further, with this structure, in the normal operation range narrower than a maximum movable range (movable range of the lens), a drive abnormality of the movable lens is detected on the basis of the counter electromotive force. Therefore, a drive abnormality can be detected appropriately.

In the lens driving device having the ninth structure described above, it is preferred that the abnormality determination portion performs an abnormality removing operation in which a normal state is restored from the abnormal state if it is determined that the abnormality has occurred (tenth structure). With this structure, even if a drive abnormality of the lens occurs, the drive abnormality can be removed without disassembling the device. Therefore, the lens driving device having this structure can be said to be user friendly.

In the lens driving device having the tenth structure described above, it is preferred that the abnormality removing operation include an operation of supplying the coil with a voltage having an absolute value larger than that of a voltage necessary for moving the lens to an end of the normal operation range (eleventh structure). With this structure, a drive force larger than a case of using in the normal operation range for moving the lens is used, and hence it can be expected to remove the drive abnormality.

In the lens driving device having the tenth or eleventh structure described above, it is preferred that the abnormality removing operation include an operation of applying a voltage to the coil so that lens moves at least once in each of a first direction and a second direction opposite to the first direction (twelfth structure). With this structure, in order to remove the drive abnormality, drive forces having two different directions are given in turn, and hence it can be expected to remove the drive abnormality.

In the lens driving device having any one of the tenth to twelfth structures, it is possible to adopt a structure (thirteenth structure) in which the abnormality removing operation includes an operation of supplying the coil with a predetermined pattern voltage in which an AC component is superimposed. With this structure, the lens (lens holder) is supplied with a force to perform a minute vibration by the superimposed AC component (that is preferably a high frequency wave), and hence it can be expected to remove the drive abnormality. Further, the voltage of the predetermined pattern may be an AC voltage given as a rectangular wave or a sine wave, for example, or may be a constant DC voltage.

In order to achieve the above-mentioned object, an optical disc apparatus of the present invention includes the lens driving device having any one of the first to thirteenth structures, and an optical pickup including the lens driving device (fourteenth structure). With this structure, because the lens holder of the lens driving device hardly generate rattling or vibration, it is possible to obtain the optical disc apparatus in which read performance and/or write performance are hardly deteriorated. In addition, if the lens driving device includes the movement detection portion and the correction process portion, lens position accuracy is improved, and hence it is possible to obtain the optical disc apparatus that is superior in its read performance or write performance. Further, if the lens driving device includes the abnormality determination portion which determines whether or not an abnormality has occurred in the lens drive on the basis of the counter electromotive force, it is possible to obtain the optical disc apparatus that can read or write appropriate information in a stable manner.

In the optical disc apparatus having the fourteenth structure described above, the optical pickup may include a light source, and an objective lens which condenses light emitted from the light source onto an information recording layer of an optical disc, in which the lens held by the lens holder is a collimator lens disposed between the light source and the objective lens in an optical path (fifteenth structure). With this structure, it is possible to realize a simple structure in which spherical aberration can be suppressed appropriately.

According to the present invention, it is possible to provide a lens driving device that hardly generate rattling or vibration in the lens holder for holding the lens. In addition, according to the present invention, it is possible to provide an optical disc apparatus in which read or write performance is hardly deteriorated.

DETAILED DESCRIPTION OF THE PREFERRED EMBODIMENTS

Hereinafter, embodiments of a lens driving device and an optical disc apparatus according to the present invention will be described with reference to the attached drawings. Further, the optical disc apparatus according to the embodiment of the present invention includes an optical pickup described below and can perform at least one of reproduction (reading information) and recording (writing information) on an optical disc. A fundamental structure thereof is the same as a known optical disc recorder or optical disc player, and hence detailed description of the fundamental structure is omitted.

<Schematic Structure of Optical Pickup According to Embodiments>

Figure 1:
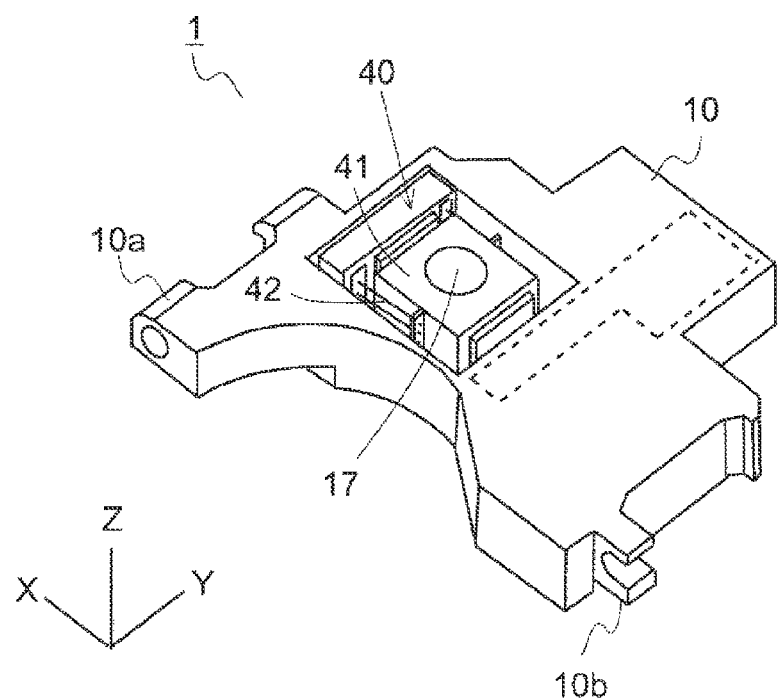
FIG. 1 is a schematic perspective view illustrating an external structure of an optical pickup according to an embodiment of the present invention.

FIG. 1 is a schematic perspective view illustrating an external structure of an optical pickup 1 according to the embodiment of the present invention. The optical pickup 1 includes a pickup base 10. Various members constituting the optical pickup 1 are mounted on the pickup base 10. Further, on the under side of the pickup base 10, there may be attached a printed circuit board (not shown) on which a circuit is formed that is necessary for operating devices mounted on the pickup base 10 (such as a light source, an objective lens actuator, a photodetector, and the like, which are described later in detail).

Bearings 10a and 10b are disposed at left and right end portions of the pickup base 10. The pickup base 10 is supported by a guide shaft (not shown) in a slidable manner using the bearings 10a and 10b. The guide shaft described here is mounted in the optical disc apparatus (for reproducing and/or recording on an optical disc). The optical pickup 1 mounted in the optical disc apparatus moves along the guide shaft so as to access to a desired address on the rotating optical disc. The optical pickup 1 that has accessed to a desired address emits light to the optical disc so as to read information from the optical disc or write information on the optical disc.

Figure 2:
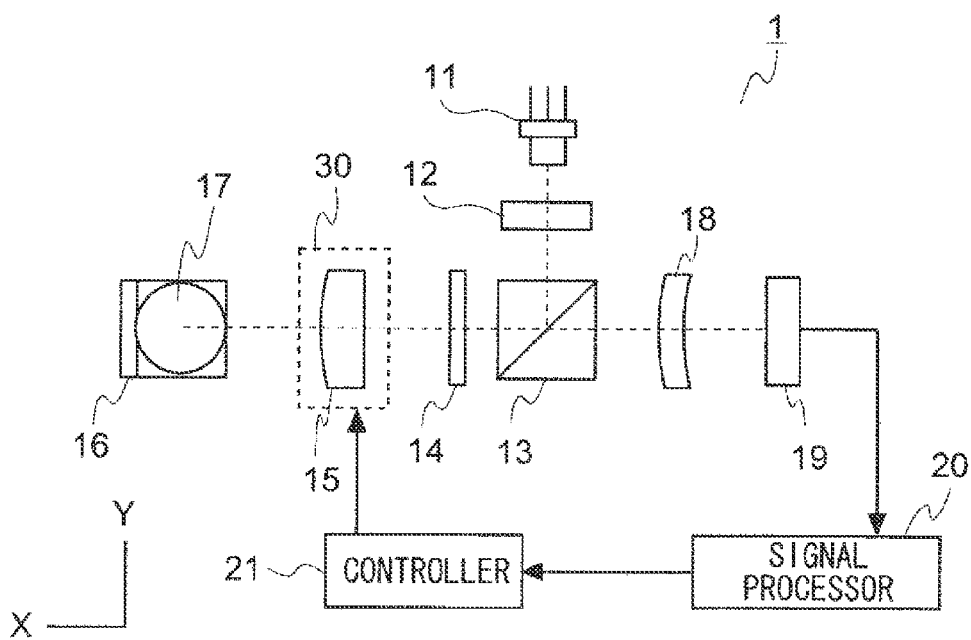
FIG. 2 is a schematic diagram illustrating an optical structure of the optical pickup according to the embodiment of the present invention.

FIG. 2 is a schematic diagram illustrating an optical structure of the optical pickup 1 according to the embodiment of the present invention. As illustrated in FIG. 2, the optical pickup 1 includes a semiconductor laser 11 (an example of a light source of the present invention). A type of the semiconductor laser 11 is determined appropriately in accordance with a type of the optical disc supported by the optical pickup 1. For instance, if the optical pickup 1 supports a Blu-ray disc (BD), a semiconductor laser that emits a laser beam having a wavelength in a 405 nm band is used as the semiconductor laser 11. In addition, if the optical pickup 1 supports a DVD, for example, a semiconductor laser that emits a laser beam having a wavelength in a wavelength 650 nm band is used as the semiconductor laser 11.

Further, if the optical pickup 1 supports a plurality of types of optical disc (for example, three types including BD, DVD, and CD) without limiting to one type of optical disc, a plurality of semiconductor lasers may be disposed, or a semiconductor laser capable of selectively emitting one of laser beams having different wavelengths may be used. In this case, the optical structure may also be changed appropriately from the structure of this embodiment. For instance, it is possible to use a plurality of objective lenses for condensing the light from the light source onto the information recording layer of the optical disc.

A diffraction element 12 included in the optical pickup 1 splits the laser beam emitted from the semiconductor laser 11 into a main beam and two sub-beams (total three beams). The diffraction element 12 is disposed for a purpose of obtaining a tracking error (TE) signal by a differential push-pull (DPP) method. However, it is possible to obtain the TE signal by a method other than the DPP method, and to eliminate the diffraction element 12 appropriately.

A polarization beam splitter 13 included in the optical pickup 1 reflects the beam from the semiconductor laser 11 toward the optical disc (not shown, which is disposed in front of the paper plane in FIG. 2) and transmits a return beam from the optical disc. This function is achieved by cooperation with a ¼ wavelength plate 14 described later. Further, in a certain case, it is possible to dispose a beam splitter without a function of separating polarized components, a half mirror, or the like instead of the polarization beam splitter 13.

The ¼ wavelength plate 14 included in the optical pickup 1 converts the linearly polarized light emitted from the semiconductor laser 11 into circularly polarized light. In addition, the ¼ wavelength plate 14 converts the return beam (circularly polarized light) from the optical disc into linearly polarized light. A polarization direction of the linearly polarized light is a direction obtained by rotating a polarization direction of the linearly polarized light emitted from the semiconductor laser 11 by 90 degrees.

A collimator lens 15 included in the optical pickup 1 can be moved in a predetermined range in an optical axis direction (X direction) by a lens driving device 30 described later in detail. Depending on a position of the collimator lens 15 in the optical axis direction, light emitted from the collimator lens 15 (toward the optical disc) becomes a collimated beam, a converging beam, or a diverging beam. Further, the lens driving device 30 is included in the pickup base 10 similarly to other optical members and is substantially disposed in an area surrounded by a broken line in FIG. 1.

A raise-up mirror 16 included in the optical pickup 1 reflects the beam from the collimator lens 15 so as to change a propagation direction of the beam. In FIG. 2, the beam, which enters through the collimator lens 15 and then is reflected by the raise-up mirror 16, propagates in the direction toward the front of the paper plane.

An objective lens 17 included in the optical pickup 1 is disposed with a space from the raise-up mirror 16 (in the front of the raise-up mirror 16 in FIG. 2) and condenses the beam from the raise-up mirror 16 onto the information recording layer (not shown) of the optical disc. The objective lens 17 is mounted in an objective lens actuator 40 disposed on the pickup base 10 (see FIG. 1). The objective lens actuator 40 is a device that enables the objective lens 17 to move in a focus direction (Z direction) and in a tracking direction (Y direction). Further, in a certain case, the objective lens actuator 40 may have a function of tilting the objective lens 17 in addition to the function of moving the objective lens 17 in the focus direction and in the tracking direction.

When reading or writing information, the optical pickup 1 needs to perform focusing control so that a focal position of the objective lens 17 is always on the information recording layer of the optical disc. In addition, when reading or writing information, the optical pickup 1 needs to perform tracking control so that a spot position of the beam condensed by the objective lens 17 onto the information recording layer of the optical disc always follows a track on the optical disc. The objective lens actuator 40 is used when the focusing control and the tracking control are performed, for example.

The objective lens actuator 40 includes a lens holder 41 that holds the objective lens 17 and has a structure for holding the lens holder 41 with a wire 42 in a rocking manner. Further, the objective lens actuator 40 moves the lens holder 41 (namely moves the objective lens 17) by a force generated by using a coil and a magnet. This type of objective lens actuator is known, and hence detailed description thereof is omitted. Further, the objective lens actuator may be other types (for example, a shaft-sliding type).

A sensor lens 18 included in the optical pickup 1 gives astigmatism to the return beam from the optical disc so as to condense the return beam onto a detection surface of a photodetector 19. The sensor lens 18 is provided with the function of giving astigmatism in order to obtain a focus error (FE) signal by an astigmatism method. However, the FE signal may be obtained by a method other than the astigmatism method. In this case, the sensor lens 18 having the function of giving astigmatism can be eliminated. Further, the return beam entering the sensor lens 18 is the beam that passes through the objective lens 17 and then is reflected by the raise-up mirror 16, so as to pass through the collimator lens 15, the ¼ wavelength plate 14, and the polarization beam splitter 13 in this order.

The photodetector 19 included in the optical pickup 1 functions as photoelectric conversion means for converting a received light signal into an electric signal. The electric signal output from the photodetector 19 is sent to a signal processor 20. The signal processor 20 generates a reproduced signal, the FE signal, the TE signal, and the like. A controller (control LSI) 21 controls, for example, the lens driving device 30, the objective lens actuator 40, and the like on the basis of a signal obtained from the signal processor 20.

As described above, the optical pickup 1 includes the lens driving device 30 that enables the collimator lens 15 to move in the optical axis direction. The collimator lens 15 is capable of moving in the optical axis direction in order to adjust convergence or divergence degree of the beam entering the objective lens 17 so as to appropriately suppress an influence of the spherical aberration. For instance, there is a BD that has a plurality of information recording layers in a thickness direction. If the information recording layer to be a target of reading or the like is different, generated amount of spherical aberration fluctuates due to a difference of a thickness of a cover layer. In addition, particularly in a case where BD is supported, if the objective lens 17 is made of resin, fluctuation of generated amount of spherical aberration due to temperature change cannot be neglected. For this reason, in the case where the optical pickup 1 supports BD, for example, it is necessary to dispose means for correcting the spherical aberration. In other words, the lens driving device 30 is installed in the optical pickup 1 as means for correcting spherical aberration. Hereinafter, a structure of the lens driving device 30 is described in detail.

<Lens Driving Device of First Embodiment>

Figure 3:
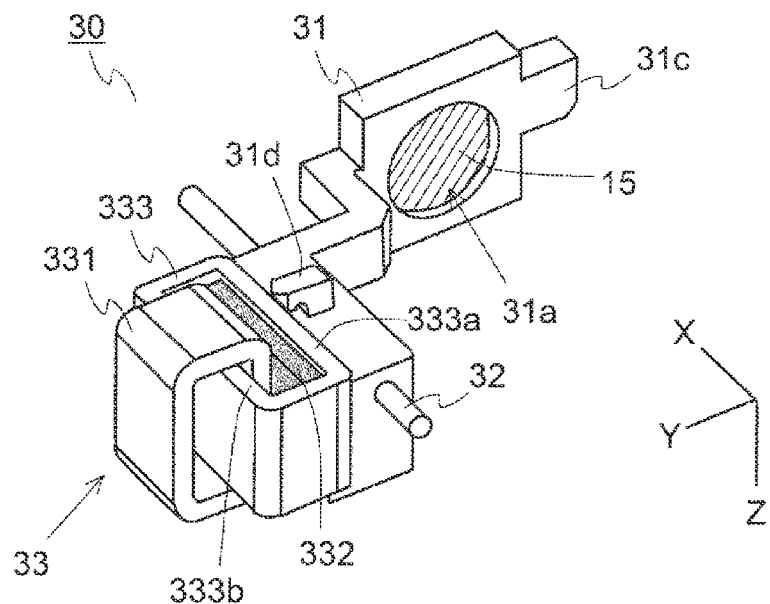
FIG. 3 is a schematic perspective view illustrating a structure of a lens driving device according to a first embodiment of the present invention.
Figure 4:
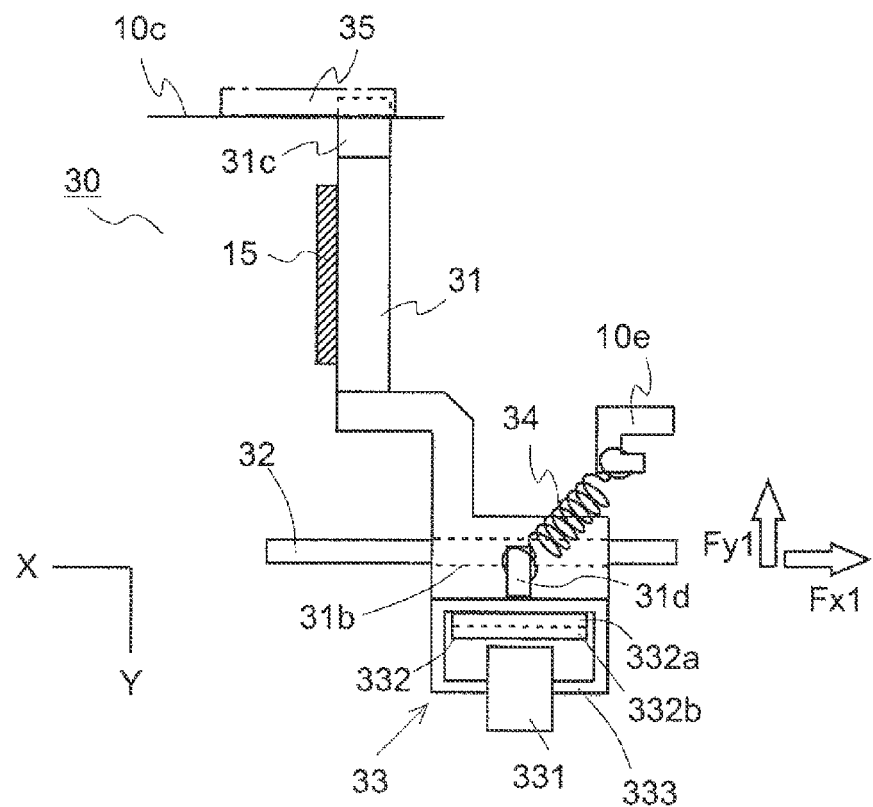
FIG. 4 is a schematic plan view illustrating a structure of the lens driving device according to the first embodiment of the present invention.

FIG. 3 is a schematic perspective view illustrating a structure of the lens driving device 30 according to a first embodiment of the present invention. FIG. 4 is a schematic plan view illustrating a structure of the lens driving device 30 according to the first embodiment of the present invention. Further, FIGS. 3 and 4 are drawn supposing that the optical pickup 1 illustrated in FIG. 1 is viewed from its backside. The same is true for FIGS. 5, 6, 7, 8A, 8B, 8C, 10, 11, 12A, 12B, and 12C, which are referred to later.

The lens driving device 30 disposed in the pickup base 10 includes a lens holder 31, a guide shaft 32, a drive portion 33, an elastic portion 34, and a guide rail 35 as illustrated in FIGS. 3 and 4. Further, in FIG. 3, the elastic portion 34 and the guide rail 35 are omitted.

The lens holder 31 is obtained by resin molding, for example. A shape of the lens holder 31 may be determined to be an appropriate shape in a design stage of the optical pickup 1 without limiting to the shape of this embodiment. The lens holder 31 is equipped with a holder portion 31a for holding the collimator lens 15. In addition, in a vicinity of an end portion of the lens holder 31 in a longitudinal direction (Y direction), there is disposed an insertion hole 31b (an example of bearing of the present invention) through which the guide shaft 32 penetrates. In addition, a protrusion 31c is disposed on the other end portion of the lens holder 31 in the longitudinal direction.

The guide shaft 32 penetrating the insertion hole 31b of the lens holder 31 is fixed to the pickup base 10 at both end portions. The guide rail 35 is a groove formed in a wall surface 10c of the pickup base 10 and engages with the protrusion 31c disposed to the lens holder 31 (see also FIG. 6 to be referred to later). The lens holder 31 is supported by the guide shaft 32 and the guide rail 35 in a movable manner, which are disposed to sandwich the holder portion 31a (collimator lens 15). The guide shaft 32 and the guide rail 35 guide the lens holder 31 to move in a direction parallel to the optical axis direction of the collimator lens 15. In other words, the optical axis direction of the collimator lens 15 held by the lens holder 31 and an extending direction of the guide shaft 35 are parallel to each other.

Further, the guide shaft 32 and the guide rail 35 are an example of a supporter portion of the present invention. In addition, in the structure of this embodiment, the movable range (maximum movable range) of the lens holder 31 (collimator lens 15) in the optical axis direction is determined by a length of the guide rail 35. The length of the guide rail 35 referred here is a length in a direction parallel to the optical axis direction of the collimator lens 15 (direction parallel to the guide shaft 32). However, without limiting to this structure, it is possible to adopt a structure in which the maximum movable range of the lens holder 31 (collimator lens 15) is determined by using another wall surface or the like.

In addition, this embodiment adopts a structure in which the guide rail 35 is a groove, but instead of this structure, it is possible to adopt a structure in which the guide rail is a salient (which is disposed on the wall surface 10c of the pickup base 10, for example). In this case, the lens holder 31 is equipped with a groove portion engaging with the salient guide rail, instead of the protrusion 31c. In addition, instead of disposing the guide rail 35, it is possible to dispose another guide shaft that is disposed in parallel to the guide shaft 32 and penetrates a bearing of the lens holder 31 (other than the insertion hole 31b). In this case, it is not necessary to dispose the protrusion 31c on the lens holder 31.

The drive portion 33 includes a coil 331, a magnet 332, and a yoke 333. The coil 331 is disposed and fixed to the pickup base 10. The coil 331 is connected to a power supply portion (not shown) via wirings, and hence it is possible to apply a voltage to the coil 331 so as to supply current. The magnet 332 and the yoke 333 are disposed and fixed to an end portion of the lens holder 31 in the longitudinal direction (Y direction) (an end portion in which the insertion hole 31b is formed). In other words, the magnet 332 and the yoke 333 move together with the lens holder 31.

The yoke 333 is constituted as a combination of two magnetic pieces having a substantially L-shaped cross section, for example, and is a hollow structure having a substantially rectangular shape in a plan view (tubular structure). The magnet 332 is disposed in the yoke 333 having the hollow structure. Among two magnetic poles (N pole and S pole), one pole 332a is formed on a side wall 333a of the yoke 333. The coil 331 fixed to the pickup base 10 is wound around a side wall 333b of the yoke 333 (opposed to the side wall 333a). Therefore, the other pole 332b of the magnet 332 is formed to be opposed to the coil 331.

The coil 331, the magnet 332, and the yoke 333 forms a magnetic circuit. When current is supplied to the coil 331, an electromagnetic force is generated by a mutual action between the current flowing in the coil 331 and a magnetic field formed by the magnet 332. Further, this generated electromagnetic force causes the movable magnet 332 to move. In other words, when the coil 331 is supplied with current, the lens holder 31 with the fixed magnet 332 is moved. By changing direction of the current flowing in the coil 331 (voltage applied to the coil 331), moving direction of the lens holder 31 is reversed. In addition, in accordance with amplitude of current flowing in the coil 331 (voltage applied to the coil 331), amplitude of the generated electromagnetic force is changed so that movement amount of the lens holder 31 is also changed.

The elastic portion 34 is constituted of an extension spring. An end of the extension spring 34 is caught by a holder hook portion 31d disposed on the lens holder 31. The holder hook portion 31d is disposed on the lens holder 31 in a vicinity of one end in the longitudinal direction (Y direction) (on the side in which the insertion hole 31b is formed).

The other end of the extension spring 34 is caught by a base hook portion 10e disposed on the pickup base 10. As illustrated in FIG. 4, the base hook portion 10e is apart from the holder hook portion 31d in a direction parallel to the optical axis direction of the collimator lens 15 (X direction). In addition, the base hook portion 10e is also apart from the holder hook portion 31d in a first direction (Y direction) perpendicular to the optical axis direction of the collimator lens 15. Further, as illustrated in FIG. 5, the base hook portion 10e is also apart from the holder hook portion 31d in a second direction (Z direction) perpendicular to the optical axis direction of the collimator lens 15.

Figure 5:
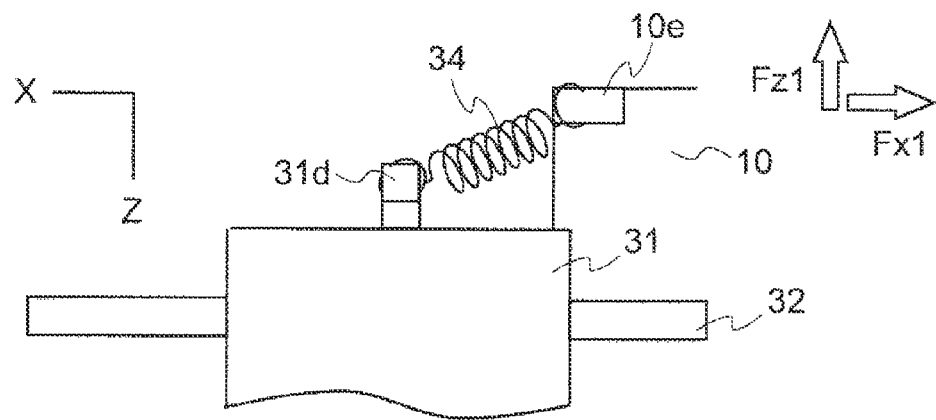
FIG. 5 is a schematic side view for explaining a structure for attaching an elastic portion of the lens driving device according to the first embodiment of the present invention.

Further, FIG. 5 is a schematic side view for explaining a structure of attaching the elastic portion (extension spring) 34 included in the lens driving device according to the first embodiment of the present invention, viewed along the Y direction.

Because the holder hook portion 31d and the base hook portion 10e have the relationship described above, the lens holder 31 is supplied with a force Fx1 (see FIGS. 4 and 5) by the extension spring 34, in a direction parallel to the optical axis direction of the collimator lens 15 (X direction or a direction parallel to the guide shaft 32). In addition, the lens holder 31 is supplied with a force Fy1 (see FIG. 4) by the extension spring 34, in the first direction perpendicular to the optical axis direction of the collimator lens 15 (Y direction or a direction perpendicular to the guide shaft 32). Further, the lens holder 31 is supplied with a force Fz1 (see FIG. 5) by the extension spring 34, in the second direction perpendicular to the optical axis direction of the collimator lens 15 (Z direction or a direction perpendicular to the guide shaft 32). In other words, the lens holder 31 is applied with the forces in three directions that are perpendicular to each other.

While the drive portion 33 is not driving the lens holder 31, the lens holder 31 is offset to one side in the movable range by the force Fx1. FIG. 4 illustrates this state. In order to move the collimator lens 15 (lens holder 31) in the optical axis direction, the drive portion 33 applies a force to the lens holder 31 in the opposite direction to the force Fx1. A position of the lens holder 31 (in the X direction) is determined by a force relationship between the electromagnetic force generated by current flowing in the coil 331 and the force Fx1 of the extension spring 34.

Between the lens holder 31 and the guide shaft 32, there is formed a clearance so that the lens holder 31 can move. This clearance may cause rattling or vibration of the lens holder 31. Concerning this point, because the extension spring 34 applies the Y direction force Fy1 and the Z direction force Fz1 (each of which is a force in a direction perpendicular to the X direction) to the lens holder 31, the lens holder 31 is always pressed to the guide shaft 32. As a result, it is possible to suppress the rattling or the like that may be caused by the clearance between the lens holder 31 and the guide shaft 32.

Figure 6:
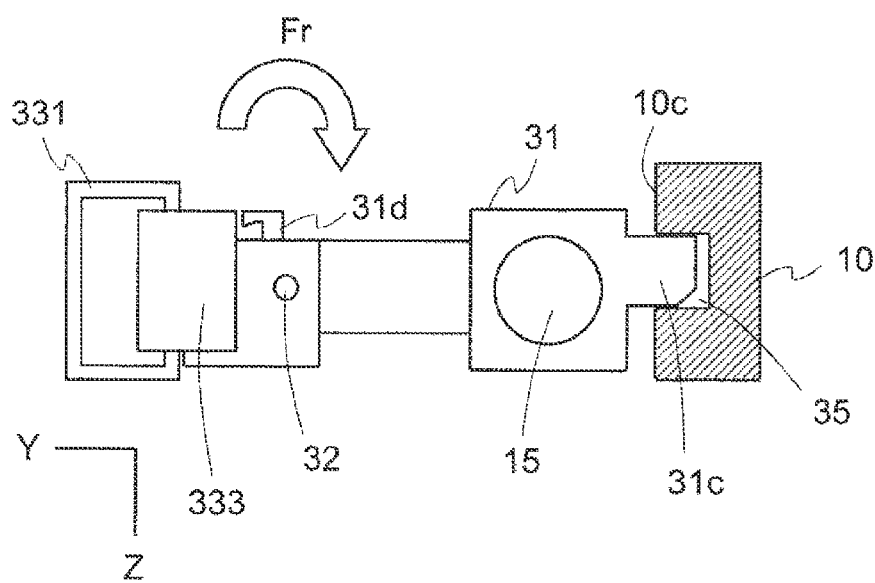
FIG. 6 is a schematic front view of the lens driving device according to the first embodiment of the present invention.

A clearance is also formed between the lens holder 31 and the guide rail 35 so that the lens holder 31 can move. This clearance may cause rattling or vibration of the lens holder 31. Concerning this point, the extension spring 34 applies the Y direction force Fy1 and the Z direction force Fz1 to the lens holder 31 at a position shifted from the guide shaft 32. In other words, as illustrated in FIG. 6, the lens holder 31 is supplied with a force Fr in a direction to rotate the lens holder 31 about the guide shaft 32. Therefore, the protrusion 31c of the lens holder 31 is always pressed to the wall surface of the guide rail 35. As a result, it is possible to suppress the rattling or the like that may be caused by the clearance between the lens holder 31 and the guide rail 35. FIG. 6 is a schematic front view of the lens driving device according to the first embodiment of the present invention, viewed along the X direction.

In the lens driving device 30 having the structure described above, rattling and vibration of the lens holder 31 is suppressed. Therefore, despite use of the lens driving device 30 for appropriately suppressing spherical aberration, there is little possibility that the collimator lens 15 is shifted in the direction perpendicular to the optical axis. In other words, it is expected to improve read and write performance of the optical pickup 1.

Further, if the forces (Fy1 and Fz1) in the directions perpendicular to the optical axis direction of the collimator lens 15 become too large, the lens holder 31 cannot be moved smoothly. Concerning this point, in this embodiment, the extension spring 34 is disposed diagonally with respect to a direction parallel to the optical axis direction of the collimator lens 15. Therefore, it is easy to avoid that the forces in the direction perpendicular to the optical axis direction of the collimator lens 15 becomes too large.

In addition, in order to move the lens holder 31 smoothly, it is preferred to dispose the extension spring 34 in a vicinity of the guide shaft 32. In addition, in order to move the lens holder 31 smoothly, it is preferred to dispose the holder hook portion 31d so that rotation in a plane parallel to the X direction (rotation of the lens holder 31) is hardly generated. In this embodiment, the holder hook portion 31d is disposed in a middle portion of the insertion hole 31b in which the guide shaft 32 penetrates, when the lens driving device 30 is viewed from the top.

In addition, the elastic portions 34 for applying the lens holder 31 with forces in three directions perpendicular to each other (X, Y, Z directions) are constituted of extension springs in this embodiment, but this structure should not be interpreted as a limitation. For instance, instead of the extension spring, other spring member such as a compression spring may be used, or a rubber member or the like may be used in a certain case. In addition, a plurality of springs may be used for constituting the elastic portion. For instance, in view of workability, durability, and the like, it is preferred to use a coil spring, in particular an extension spring.

<Lens Driving Device of Second Embodiment>

Next, a lens driving device of a second embodiment is described. A structure of the lens driving device of the second embodiment is substantially the same as the structure of the lens driving device 30 of the first embodiment. Hereinafter, portions different from the first embodiment are mainly described. Further, the same part as in the first embodiment is denoted by the same numeral, and overlapping description thereof is omitted unless otherwise necessary.

Figure 7:
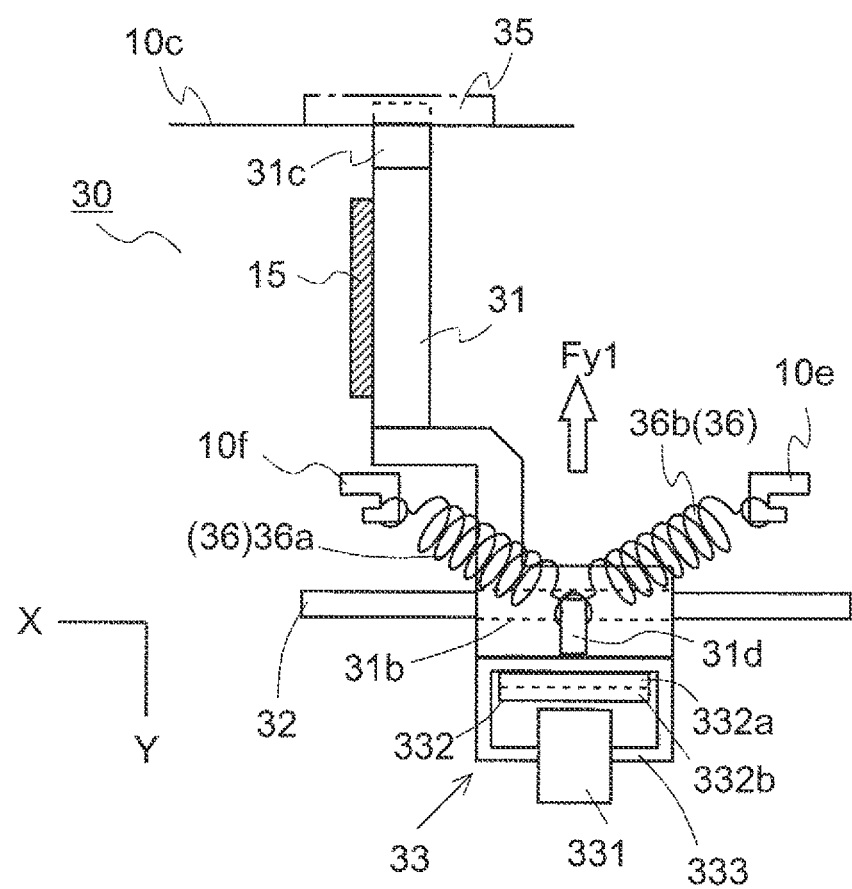
FIG. 7 is a schematic plan view illustrating a structure of the lens driving device according to a second embodiment of the present invention.

FIG. 7 is a schematic plan view illustrating a structure of the lens driving device 30 according to the second embodiment of the present invention. As illustrated in FIG. 7, the lens driving device 30 of the second embodiment is different from the structure of the first embodiment in that an elastic portion 36 that can apply a force in a predetermined direction to the lens holder 31 is constituted of two extension springs 36a and 36b. In this embodiment, the two extension springs 36a and 36b are the same type.

An end of each of two extension springs 36a and 36b is caught by the holder hook portion 31d disposed on the lens holder 31. Similarly to the case of the first embodiment, the holder hook portion 31d is disposed in a vicinity of one end portion of the lens holder 31 in the longitudinal direction (Y direction) (an end portion to which the insertion hole 31b is disposed). In addition, the holder hook portion 31d is disposed in a middle portion of the insertion hole 31b in which the guide shaft 32 penetrates when the lens driving device 30 is viewed from the top.

The other end of the first extension spring 36a is caught by the first base hook portion 10e disposed to the pickup base 10. A structure of the first base hook portion 10e is the same as that in the first embodiment (see FIGS. 4 and 5). The other end of the second extension spring 36b is caught by a second base hook portion 10f disposed to the pickup base 10. The second base hook portion 10f is disposed symmetrically with the first base hook portion 10e. Therefore, the two extension springs 36a and 36b are also disposed in a symmetric manner. Further, it is supposed here that the drive portion 33 is not driving the lens holder 31, and FIG. 7 is a diagram based on the supposition. In addition, the two extension springs 36a and 36b are disposed symmetrically with respect to a plane perpendicular to the X direction, passing through the holder hook portion 31d.

The two extension springs 36a and 36b apply the forces to the lens holder 31 in opposite directions in parallel to the optical axis direction of the collimator lens 15 (X direction or a direction parallel to the guide shaft 32). Therefore, if the drive portion 33 is not driving the lens holder 31, the lens holder 31 is at a neutral position in which X direction forces of the two extension springs 36a and 36b are balanced.

On the other hand, the two extension springs 36a and 36b apply the forces in the same direction in the first direction (Y direction or a direction perpendicular to the guide shaft 32) and the second direction (Z direction or a direction perpendicular to the guide shaft 32), which are perpendicular to the optical axis direction of the collimator lens 15. Therefore, the Y direction force Fy1 and the Z direction force Fz1 are always applied to the lens holder 31. In other words, similar to the case of the first embodiment, the lens holder 31 is pressed to the guide shaft 32 and to the wall surface of the guide rail 35, so that rattling or the like is suppressed.

Figure 8A:
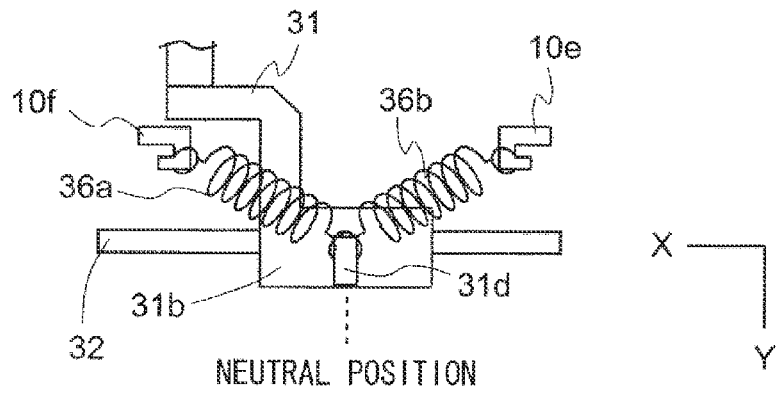
FIG. 8A is a diagram illustrating a state where a drive portion does not generate a drive force in the lens driving device according to the second embodiment of the present invention.
Figure 8B:
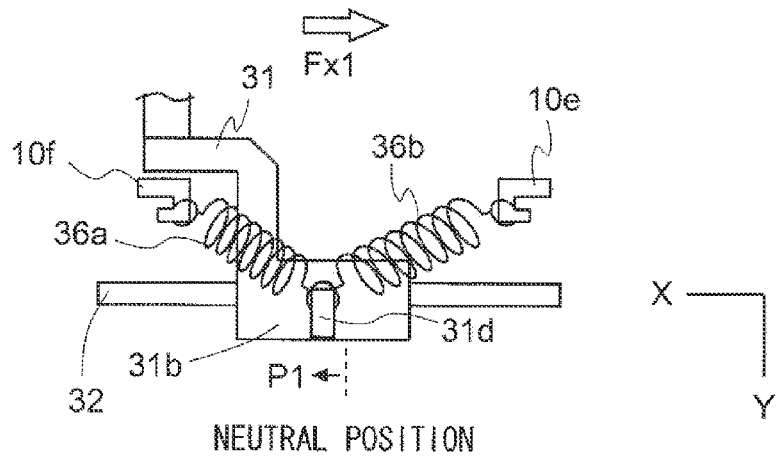
FIG. 8B is a diagram illustrating a state where the drive portion generates a drive force in one direction in the lens driving device according to the second embodiment of the present invention.
Figure 8C:
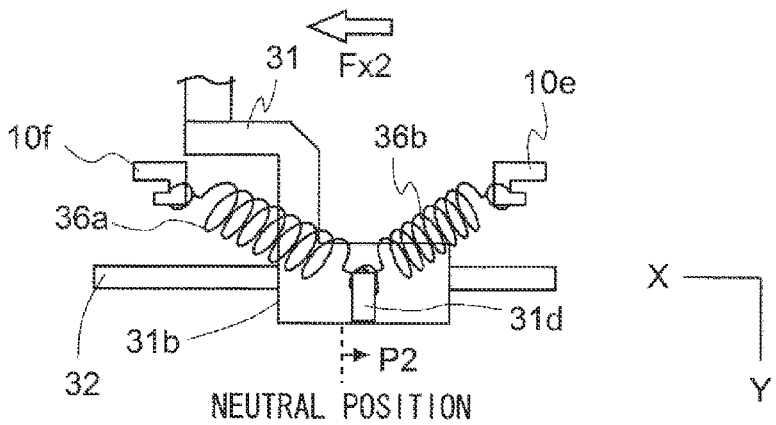
FIG. 8C is a diagram illustrating a state where the drive portion generates a drive force in the other direction in the lens driving device according to the second embodiment of the present invention.

FIGS. 8A, 8B, and 8C are schematic plan views illustrating the elastic portion 36 and vicinity thereof in the lens driving device 30 of the second embodiment. FIG. 8A is a diagram illustrating a state where a drive force (electromagnetic force) is not generated in the drive portion 33. FIG. 8B is a diagram illustrating a state where the drive force is generated in one direction in the drive portion 33. FIG. 8C is a diagram illustrating a state where the drive force is generated in the other direction in the drive portion 33.

In FIG. 8A, because no drive force is generated in the drive portion 33, the lens holder 31 is positioned in the neutral position in the X direction (in which X direction forces of the two springs 36a and 36b are balanced). In this embodiment, the neutral position is substantially the same as a midpoint position in the movable range of the lens holder 31. However, this structure is not a limitation. It is possible to adopt a structure in which the neutral position is disposed at a position shifted from the midpoint position in the movable range of the lens holder 31.

In FIG. 8B, the drive portion 33 applies a force to move the lens holder 31 in one direction (leftward direction) in the X direction. This force causes the lens holder 31 to move from the neutral position so that the first extension spring 36a is compressed while the second extension spring 36b is expanded. As a result, the balance between the X direction forces of the two extension springs 36a and 36b is canceled, and the force Fx1 in the other direction (rightward direction) in the X direction (force by the elastic portion 36) is applied to the lens holder 31. A position of the lens holder 31 is determined on the basis of a relationship between the force Fx1 and the drive force generated by the drive portion 33. In FIG. 8B, the lens holder 31 is disposed at position P1 shifted to the left direction from the neutral position.

In FIG. 8C, the drive portion 33 applies a force to move the lens holder 31 in the X direction in the other direction (rightward direction). This force causes the lens holder 31 to move from the neutral position so that the first extension spring 36a is expanded while the second extension spring 36b is compressed. As a result, the balance between the X direction forces of the two extension springs 36a and 36b is canceled, and a force Fx2 in one direction (leftward direction) in the X direction (force by the elastic portion 36) is applied to the lens holder 31. A position of the lens holder 31 is determined on the basis of a relationship between the force Fx2 and the drive force generated by the drive portion 33. In FIG. 8C, the lens holder 31 is positioned at a position P2 shifted to the rightward direction from the neutral position.

In this structure, because the lens holder 31 is moved with respect to a vicinity of the midpoint in the movable range, it is possible to set the lens holder 31 (collimator lens 15) to a target position more quickly than the structure of the first embodiment in which the lens holder 31 is moved with respect to one end in the movable range. Therefore, it can be expected that wait time until reading operation or the like is started in the optical pickup 1 is shortened. In addition, it is also possible to reduce drive power necessary for driving the lens holder 31. Further, similarly to the first embodiment, because rattling or vibration of the lens holder 31 can be suppressed, it can be expected that read and write performance of the optical pickup 1 is improved.

Figure 9:
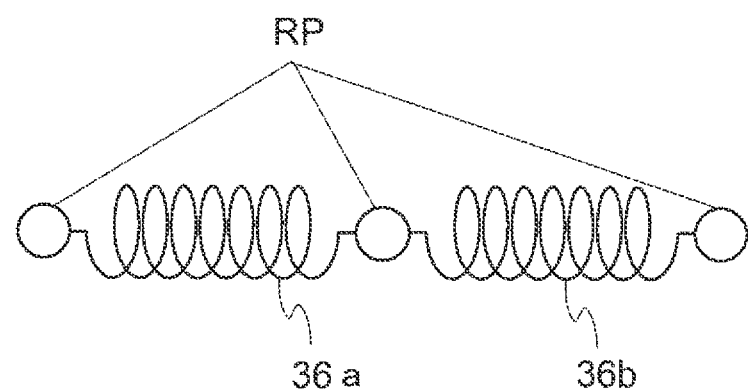
FIG. 9 is a diagram for explaining a variation example of an elastic portion of the lens driving device according to the second embodiment.

Further, the elastic portion 36 that can apply the force to the lens holder 31 in the three directions perpendicular to each other (X, Y, and Z directions) is constituted of the two extension springs 36a and 36b in this embodiment, but this structure should not be interpreted to be a limitation. The two extension springs 36a and 36b may be bundled (apparently as one spring) as illustrated in FIG. 9. In FIG. 9, symbol RP denotes a ring portion for engaging with the hook portion. With this structure, the number of components can be reduced so that improvement of workability can be expected. In addition, also in this embodiment, other spring member such as a compression spring may be used for the elastic portion instead of the extension spring, or a rubber member or the like may be used in a certain case. For instance, in view of workability, durability, and the like, it is preferred to use a coil spring, in particular the extension spring.

<Lens Driving Device of Third Embodiment>

Next, a lens driving device of a third embodiment is described. A structure of the lens driving device of the third embodiment is generally the same as the structure of the lens driving device 30 of the first embodiment. Hereinafter, portions different from the first embodiment are mainly described. Further, the same part as in the first embodiment is denoted by the same numeral, and overlapping description thereof is omitted unless otherwise necessary.

Figure 10:
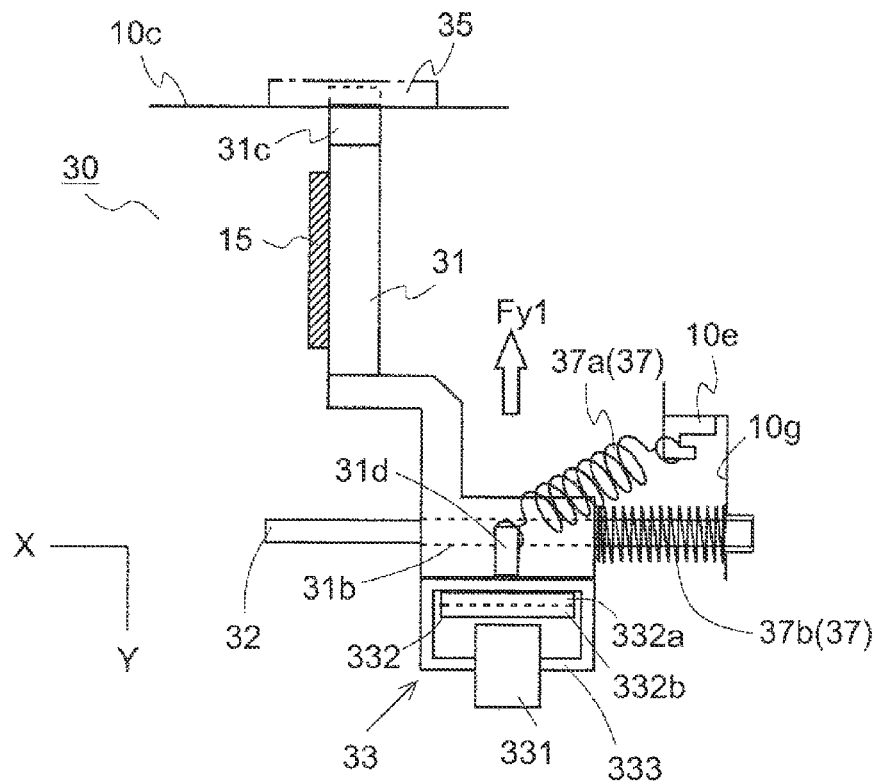
FIG. 10 is a schematic plan view illustrating a structure of a lens driving device according to a third embodiment of the present invention.
Figure 11:
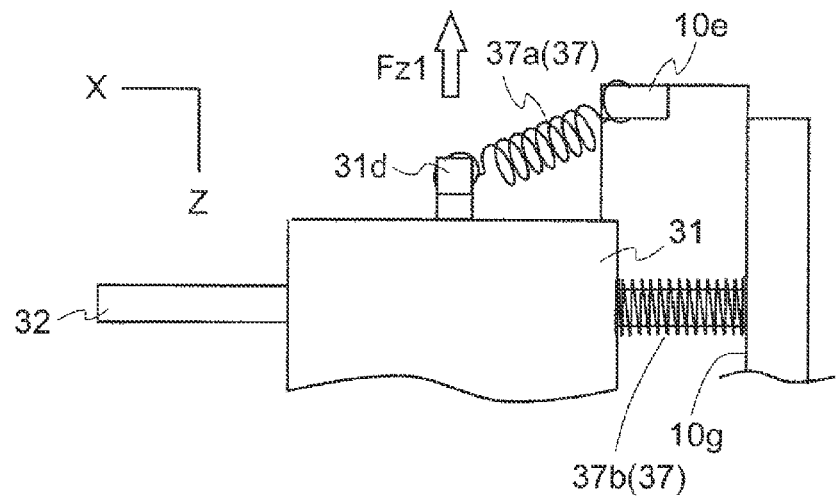
FIG. 11 is a schematic side view for explaining a structure for attaching an elastic portion of the lens driving device according to the third embodiment of the present invention.

FIG. 10 is a schematic plan view illustrating a structure of the lens driving device 30 according to the third embodiment of the present invention. In addition, FIG. 11 is a schematic side view for explaining a structure of attaching an elastic portion 37 included in the lens driving device 30 according to the third embodiment of the present invention. Further, FIGS. 10 and 11 illustrate a state where the drive portion 33 is not driving the lens holder 31.

As illustrated in FIGS. 10 and 11, the lens driving device 30 of the third embodiment is different from the structure of the first embodiment in that the elastic portion 37 that can apply the force of the lens holder 31 in a predetermined direction is constituted of an extension spring 37a and a compression spring 37b. The extension spring 37a and a structure for attaching the extension spring 37a (the base hook portion 10e and the holder hook portion 31d) have the same structure as the case of the extension spring 34 in the first embodiment. Therefore, description of the structure of attaching the extension spring 37a is omitted.

The compression spring 37b is loosely fit around the guide shaft 32. An end of the compression spring 37b abuts the lens holder 31, and the other end of the compression spring 37b abuts a wall 10g of the pickup base 10.

The extension spring 37a and the compression spring 37b apply forces to the lens holder 31 in the opposite direction in a direction parallel to the optical axis direction of the collimator lens 15 (X direction or a direction parallel to the guide shaft 32). If the drive portion 33 is not driving the lens holder 31, the lens holder 31 is positioned at a neutral position in which the X direction forces of the two springs 37a and 37b are balanced.

Further, similarly to the extension spring 34 in the first embodiment, the extension spring 37a applies forces in the first direction (Y direction or a direction perpendicular to the guide shaft 32) and the second direction (Z direction or a direction perpendicular to the guide shaft 32), which are perpendicular to the optical axis direction of the collimator lens 15. In other words, the lens holder 31 is always applied with forces in the Y direction force Fy1 (see FIG. 10) and in the Z direction force Fz1 (see FIG. 11). Therefore, similarly to the case of the first embodiment, the lens holder 31 is always pressed to the guide shaft 32 and to the wall surface of the guide rail 35, so that rattling or the like can be suppressed.

Figure 12A:
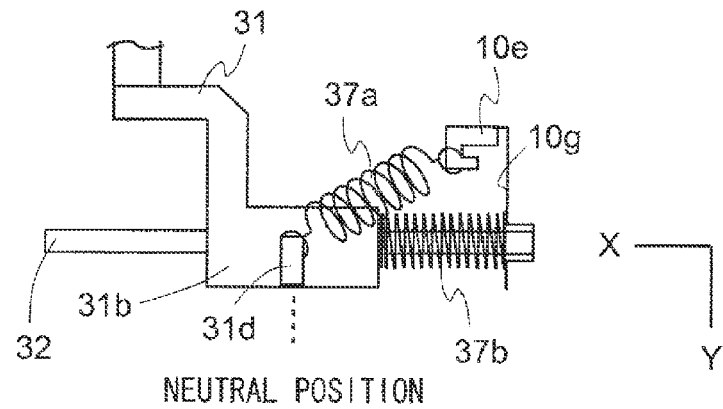
FIG. 12A is a diagram illustrating a state where a drive portion does not generate a drive force in the lens driving device according to the third embodiment of the present invention.
Figure 12B:
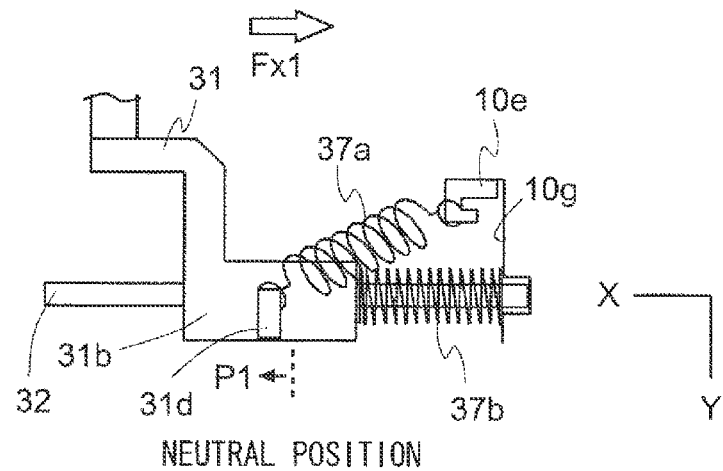
FIG. 12B is a diagram illustrating a state where the drive portion generates a drive force in one direction in the lens driving device according to the third embodiment of the present invention.
Figure 12C:
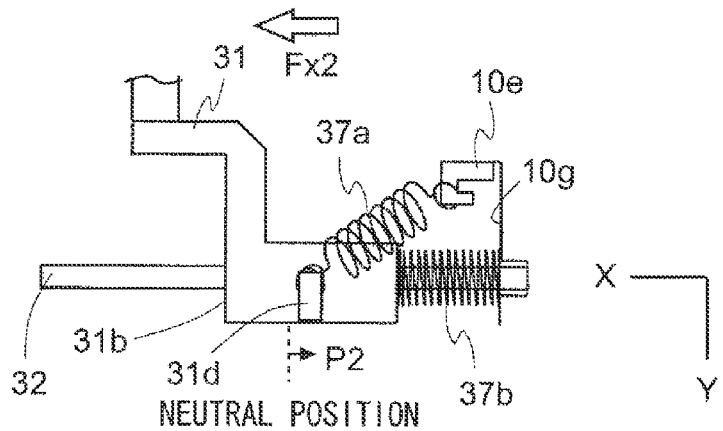
FIG. 12C is a diagram illustrating a state where the drive portion generates a drive force in the other direction in the lens driving device according to the third embodiment of the present invention.

FIGS. 12A, 12B, and 12C are schematic plan views illustrating the elastic portion 37 and its vicinity in the lens driving device 30 of the third embodiment. FIG. 12A is a diagram illustrating a state where the drive portion 33 does not generate the drive force (electromagnetic force). FIG. 12B is a diagram illustrating a state where the drive portion 33 generates the drive force in one direction. FIG. 12C is a diagram illustrating a state where the drive portion 33 generates the drive force in the other direction.

In FIG. 12A, because the drive portion 33 does not generate the drive force, the lens holder 31 is at a neutral position in the X direction (position in which the X direction forces of the two springs 37a and 37b are balanced). In this embodiment, the neutral position is disposed to be substantially the same as a midpoint position in the movable range of the lens holder 31. However, without limiting to this structure, the neutral position may be disposed at a position shifted from the midpoint position of the movable range of the lens holder 31.

In FIG. 12B, the drive portion 33 applies a force to move the lens holder 31 in one direction in the X direction (leftward direction). This force makes the lens holder 31 move from the neutral position, and each of the extension spring 37a and the compression spring 37b is expanded in length compared with that in the neutral position. As a result, the balance between the extension spring 37a and the compression spring 37b in the X direction force is canceled, and hence the lens holder 31 is supplied with a force Fx1 (by the elastic portion 37) in the other direction in the X direction (rightward direction). A position of the lens holder 31 is determined on the basis of a relationship between the force Fx1 and the drive force generated by the drive portion 33. In FIG. 12B, the lens holder 31 is disposed at the position P1 shifted from the neutral position in the left direction.

In FIG. 12C, the drive portion 33 applies a force to move the lens holder 31 in the other direction in the X direction (rightward direction). This force makes the lens holder 31 move from the neutral position, and each of the extension spring 37a and the compression spring 37b is compressed in length compared with the state in the neutral position. As a result, the balance between the extension spring 37a and the compression spring 37b in the X direction force is canceled, and the lens holder 31 is supplied with a force Fx2 (by the elastic portion 37) in one direction in the X direction (leftward direction). A position of the lens holder 31 is determined on the basis of a relationship between the force Fx2 and the drive force generated by the drive portion 33. In FIG. 12C, the lens holder 31 is disposed at the position P2 shifted from the neutral position in the right direction.

With this structure, similarly to the case of the second embodiment, because the lens holder 31 is moved with respect to a vicinity of the midpoint in the movable range, the lens holder 31 (collimator lens 15) can be set to a target position more quickly than the structure of the first embodiment in which the lens holder 31 is moved with respect to the one end in the movable range. Therefore, it can be expected that wait time until reading operation or the like in the optical pickup 1 is started is shortened. In addition, it is also possible to reduce drive power necessary for driving the lens holder 31. Further, similarly to the first embodiment, because rattling or vibration of the lens holder 31 can be suppressed, it can be expected that read and write performance of the optical pickup 1 is improved. In addition, in this structure of the third embodiment, the two coil springs 37a and 37b constituting the elastic portion 37 are gathered and disposed in one side. Therefore, with the structure of the third embodiment, the lens driving device 30 can be constituted with saved space.

<Lens Driving Device of Fourth Embodiment>

Next, a lens driving device of a fourth embodiment is described. A structure of the lens driving device of the fourth embodiment is generally the same as the structure of the lens driving device of the third embodiment. Hereinafter, portions different from the third embodiment are mainly described. Further, the same part as in the third embodiment is denoted by the same numeral, and overlapping description thereof is omitted unless otherwise necessary.

The lens driving device 30 of the fourth embodiment has a structure in which the collimator lens 15 is moved in the optical axis direction utilizing an electromagnetic force generated by using the coil 331 and the magnet 332. In this lens driving device 30, a movement amount of the collimator lens 15 with respect to a drive set value (such as a drive voltage value or a drive current value) may have a variation due to a variation of a component characteristic such as a variation of resistance of the coil 331 or a variation of magnetic flux of the magnet 332. Further, the component characteristic variation can be generated not only in the manufacturing process but also by fluctuation of environment (such as temperature or humidity) in which the lens driving device 30 (optical pickup 1) is installed. Considering this point, the lens driving device 30 of the fourth embodiment has a function of correcting the movement amount variation of the collimator lens 15 so as to improve position accuracy of the collimator lens 15. Hereinafter, this function is described.

Figure 13:
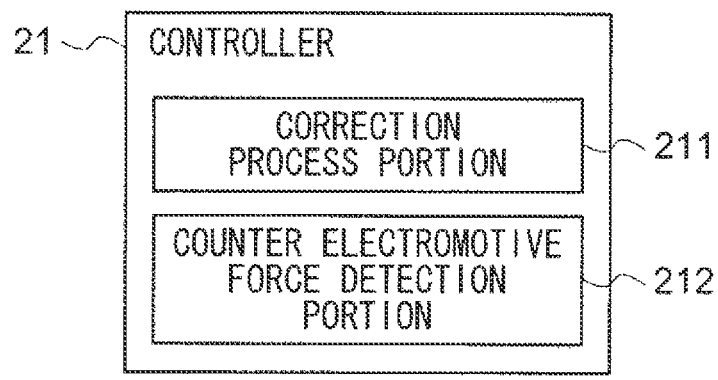
FIG. 13 is a diagram for explaining a structure of a controller included in a lens driving device according to a fourth embodiment of the present invention.

The controller 21 for controlling drive of the lens driving device 30 includes a correction process portion 211 having a function of correcting the movement amount variation of the collimator lens 15 as illustrated in FIG. 13. The correction process portion 211 performs the process of correcting variation of the movement amount of the collimator lens 15 in accordance with a flow illustrated in FIG. 14.

Further, as a timing for performing this correction process, for example, there are following timings considering correction of variation of each device, and/or correction of variation caused by fluctuation of the component characteristic due to environmental change. As a first timing example, there is a timing just after the optical pickup 1 (or the lens driving device 30) is powered on.

As a second timing example, there is a timing when a parameter indicating fluctuation of environment such as temperature or humidity is determined to be shifted from a predetermined reference value. In this case, it is necessary to use a sensor for detecting the environmental change (a temperature sensor, a humidity sensor, or the like), and it is preferred to dispose the sensor in a vicinity of the lens driving device 30. Further, a thermistor for detecting ambient temperature of the optical pickup 1 may be mounted on the printed circuit board (not shown) included in the optical pickup 1, and the thermistor may be used as the temperature sensor described above.

As a third timing example, there is a certain timing after the optical pickup 1 instructs to read or write information and before the read or write operation is started.

As other timing (for performing the correction process), there is a timing when the optical pickup 1 is determined to change its position. The optical disc apparatus equipped with the optical pickup 1 may be installed horizontally or vertically, for example. For instance, an influence of gravity is different between the vertical installation and horizontal installation. Therefore, the neutral position of the above-mentioned lens holder 31 (collimator lens 15) is fluctuated, and a drive set pattern for moving the collimator lens 15 is fluctuated. Therefore, if it is determined that a position of the optical pickup is changed, it is preferred to perform the process of correcting variation of a movement amount of the collimator lens 15.

Further, for the position change of the optical pickup 1, it is possible to adopt a structure of using a position change detection unit such as a gyrosensor for detection. However, it is possible to determine presence or absence of the position change without using a position change detection unit, for example, by preparing a drive set condition of a drive mechanism for each predetermined position (as a table for example) so as to determine on the basis of whether or not the set condition is suitable.

Figure 14:
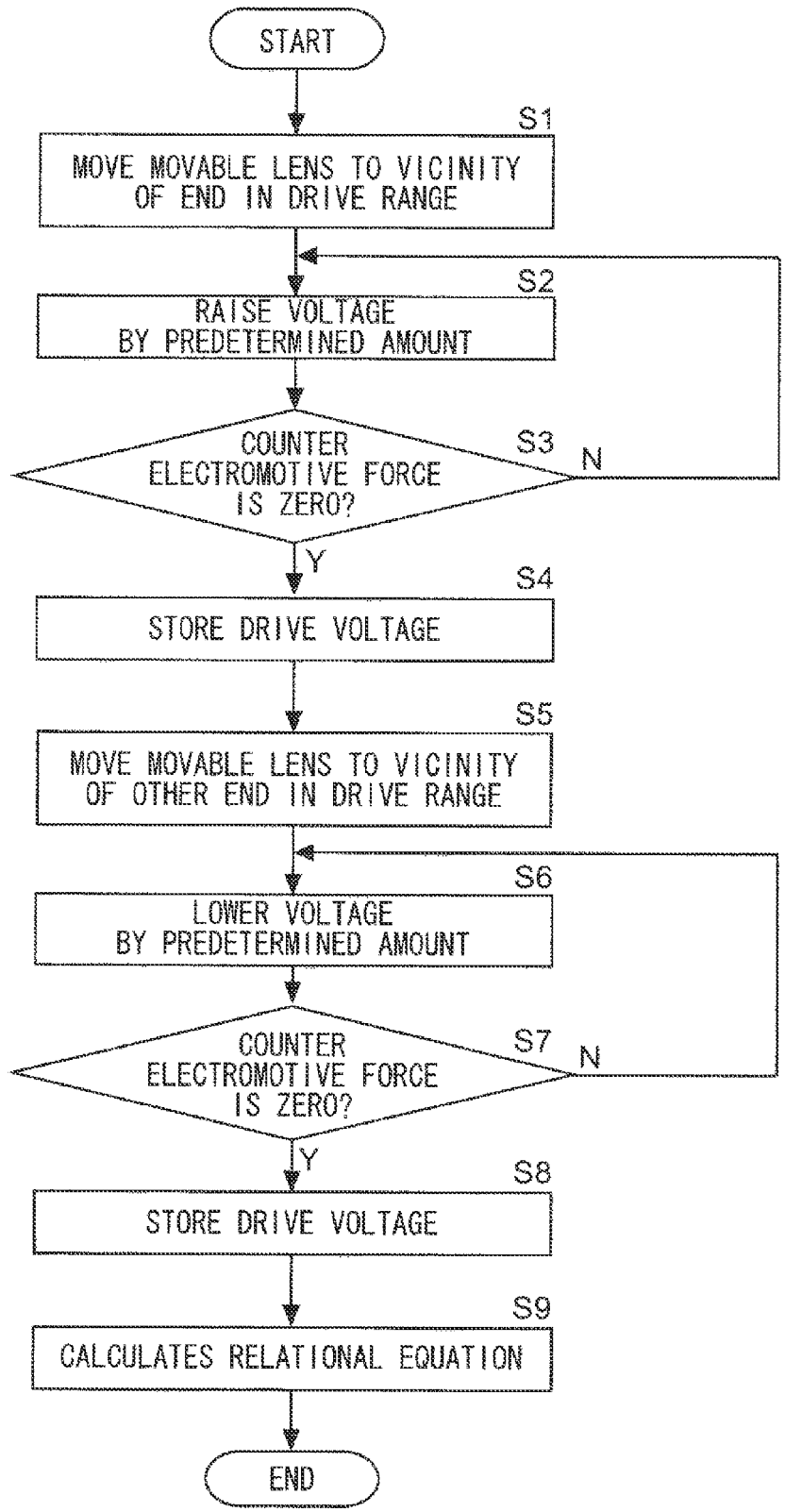
FIG. 14 is a flowchart illustrating a process flow executed by the lens driving device according to the fourth embodiment of the present invention so as to correct movement amount variation of a collimator lens.
Figure 15:
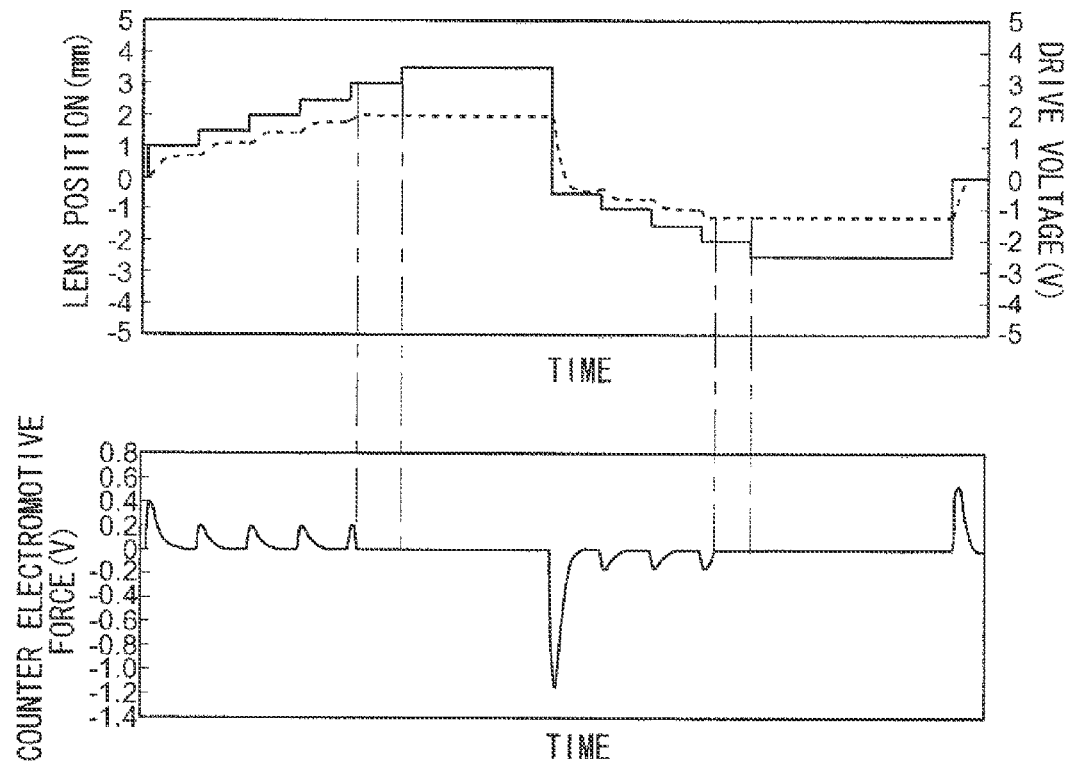
FIG. 15 is a graph indicating temporal changes of a collimator lens position, a voltage applied to a coil (drive voltage), and a counter electromotive force during a period while a correction process is performed in the lens driving device according to the fourth embodiment of the present invention.

Hereinafter, with reference to FIGS. 14 and 15, the correction process performed by the correction process portion 211 is described in detail. Here, FIG. 15 is a graph indicating temporal changes of a position of the collimator lens 15, a voltage (drive voltage) applied to the coil 331, and a counter electromotive force, during a period while the lens driving device 30 according to the fourth embodiment of the present invention is performing the correction process. In the graph in the upper part of FIG. 15, a solid line indicates a temporal change of the drive voltage, and a broken line indicates a temporal change of a position of the collimator lens 15. Further, a voltage value (drive voltage value) applied to the coil 331 is an example of the drive set value of the drive portion in the present invention.

When the correction process portion 211 determines a timing for performing the correction process, the correction process portion 211 first moves the collimator lens 15 to a vicinity of the one end in the drive range (movable range) (Step S1). In the example illustrated in FIG. 15, this state corresponds to a state where the drive voltage of 1 V is applied. When the drive voltage is applied to the coil 331, current flows in the coil 331. Then, as described above, the electromagnetic force is generated so that the collimator lens 15 is moved. Further, it is preferred to determine the drive voltage applied here so that the collimator lens 15 does not reach the one end (limit position) in the drive range (to be positioned a little before the one end) in view of the variation.

When the collimator lens 15 (held by the lens holder 31) moves, the magnet 332 fixed to the lens holder 31 moves. Therefore, according to Lenz's law, a counter electromotive force e is generated (e=Bvl, B is a magnetic flux density of the magnet 332, v is a moving speed of the magnet 332, and l is an effective length of the coil 331) (see FIG. 15). The controller 21 includes a counter electromotive force detection portion 212 for detecting the counter electromotive force (see FIG. 13). The counter electromotive force can be determined on the basis of a difference between a given drive voltage value and a measured voltage value.

When the counter electromotive force detection portion 212 detects the counter electromotive force, it can be detected that the collimator lens 15 has moved. If the counter electromotive force is not detected (If the counter electromotive force is zero), it can be detected that the collimator lens has not moved. In addition, it is possible to determine the movement amount of the collimator lens 15 on the basis of a pattern of the counter electromotive force in a certain case. In other words, the counter electromotive force detection portion 212 is an example of the movement detection portion of the present invention.

When the collimator lens 15 is moved to a vicinity of the one end in the drive range, the drive voltage (to be applied to the coil 331) is raised next by a predetermined amount (Step S2). In the example illustrated in FIG. 15, the predetermined amount described above is set to 0.5 V. Further, when the drive voltage is raised by the predetermined amount, it is determined whether or not the counter electromotive force detected by the counter electromotive force detection portion 212 is zero (Step S3). If it is determined that the counter electromotive force is not zero (No in Step S3), the process returns to Step S2, in which the drive voltage is further raised by the predetermined amount. In other words, the drive voltage is raised step by step by the predetermined amount until it is detected that the counter electromotive force is zero, as illustrated in FIG. 15.

If it is determined that the counter electromotive force is zero (Yes in Step S3), the correction process portion 211 determines that a position of the collimator lens 15 has reached the limit position in which the collimator lens 15 cannot move any more even if the drive voltage is further raised. In this case, the correction process portion 211 stores the drive voltage (3.5 V in the example illustrated in FIG. 15) in a storage unit (memory) (not shown) (Step S4).

Next, the correction process portion 211 moves the collimator lens 15 to a vicinity of the other end portion in the drive range (Step S5). In the example illustrated in FIG. 15, it corresponds to a state where a drive voltage of −0.5 V is applied. Further, it is also preferred to determine the drive voltage applied here so that the collimator lens 15 does not reach the other end (limit position) in the drive range (to be positioned a little before the other end) in view of the variation.

When the collimator lens 15 is moved to a vicinity of the other end portion in the drive range, next, the drive voltage is lowered by a predetermined amount (Step S6). In the example illustrated in FIG. 15, the predetermined amount described above is set to −0.5 V. Further, when the drive voltage is lowered by the predetermined amount, it is checked whether or not the counter electromotive force detected by the counter electromotive force detection portion 212 is zero (Step S7). If it is determined that the counter electromotive force is not zero (No in Step S7), the process returns to Step S6, in which the drive voltage is further lowered by the predetermined amount. In other words, the drive voltage is lowered step by step by the predetermined amount until it is detected that the counter electromotive force is zero, as illustrated in FIG. 15.

If it is determined that the counter electromotive force is zero (Yes in Step S7), the correction process portion 211 determines that a position of the collimator lens 15 has reached the limit position in which the collimator lens 15 cannot move any more even if the drive voltage is further lowered. In this case, the correction process portion 211 stores the drive voltage (−2.5 V in the example illustrated in FIG. 15) in a storage unit (memory) (not shown) (Step S8).

Next, the correction process portion 211 calculates a relational equation (association relationship) between the drive voltage and the movement amount of the collimator lens 15 (moving distance) (Step S9). Specifically, the correction process portion 211 regards a drive voltage (3 V) that is one step before the drive voltage stored in Step S4 to be a maximum drive limit voltage (Vmax), and regards a drive voltage (−2 V) that is one step before the drive voltage stored in Step S8 to be a minimum drive limit voltage (Vmin). Here, the maximum drive limit voltage is supposed to be a voltage for permitting the collimator lens 15 to be at the one end in the drive range. In addition, the minimum drive limit voltage is supposed to be a voltage for permitting the collimator lens 15 to be at the other end in the drive range.

Figure 16:
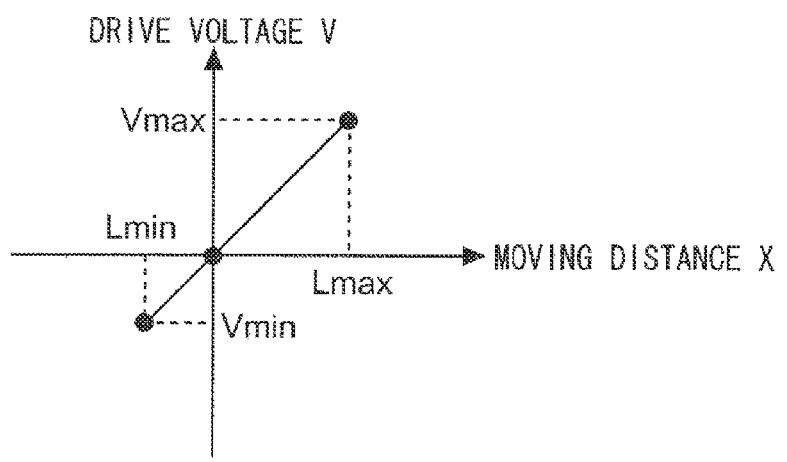
FIG. 16 is a graph indicating a relationship between a voltage applied to the coil (drive voltage) and a moving distance of the collimator lens in the lens driving device according to the fourth embodiment of the present invention.

Further, a distance from the neutral position to the one end is denoted by Lmax, and a distance from the neutral position to the other end is denoted by Lmin. Then, the correction process portion 211 calculates the following equation (1), for example. Further, in this case, the correction process portion 211 performs the calculation process on the precondition that the drive voltage V and the moving distance X can be expressed as a linear function as illustrated in FIG. 16. In addition, by calculating the equation (1), it is possible to obtain the movement amount of the collimator lens 15 per unit drive voltage value. Further, in this embodiment, Lmax−Lmin corresponds to a length of the guide rail 35 (a length in a direction parallel to the optical axis direction of the collimator lens 15).

$$V = (V\text{max} - V\text{min})/(L\text{max} - L\text{min}) \times X \quad (1)$$

In this way, the process of correcting variation of the movement amount of the collimator lens 15 is finished. After that, the drive voltage value for driving the lens driving device 30 is determined in accordance with the equation (1).

According to the above description, the drive voltage value to be applied is determined in accordance with the relational equation (1) obtained by determining a measured voltage for reaching the limits (both ends) in the drive range. Therefore, it is possible to correct (reduce) a variation of the movement amount of the collimator lens 15 due to a variation of a component characteristic so as to improve position accuracy of the collimator lens 15. In addition, because the structure described above is a structure for correction using the counter electromotive force generated when the drive portion 33 is driven, it is not necessary to add a dedicated sensor for measuring a movement amount, and the structure is advantageous for reducing cost and size.

Further, in the example illustrated in FIG. 15, the drive voltage is increased or decreased by 0.5 V step by step. However, it is possible to obtain more accurate maximum drive limit voltage and minimum drive limit voltage by further reducing the drive voltage of the increased or decreased step. In other words, by setting the drive voltage of the increased or decreased step to be smaller value, the position accuracy of the collimator lens 15 can be further improved.

Figure 17:
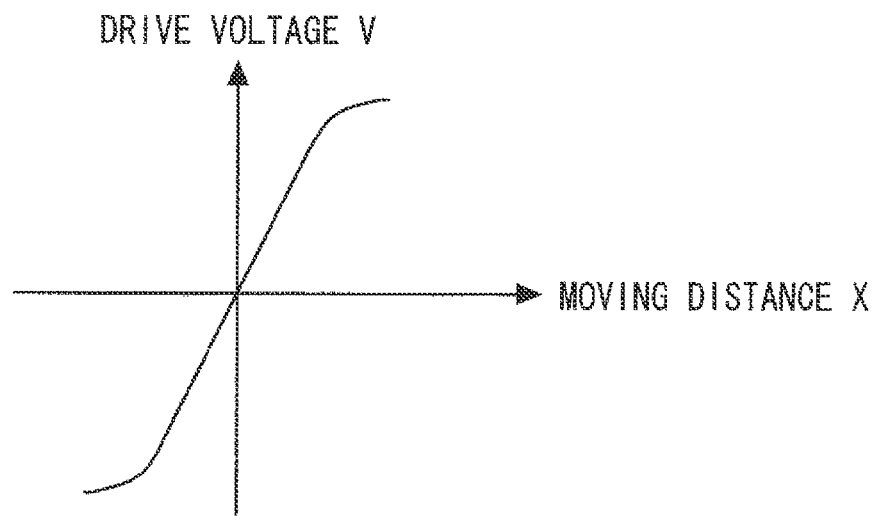
FIG. 17 is an explanatory diagram regarding a relationship between the voltage applied to the coil (drive voltage) and the moving distance of the collimator lens.

Here, if the drive range (movable range) of the collimator lens 15 is much larger than the case of the embodiment described above, the relationship between the voltage (drive voltage) applied to the coil 331 and the moving distance of the collimator lens 15 cannot be expressed by a linear function as illustrated in FIG. 17. This is related to the fact that as the moving distance of the collimator lens 15 becomes larger, a magnetic force applied to the coil 331 by the magnet 332 becomes smaller.

On the contrary, in the lens driving device 30 of this embodiment, the coil 331, the magnet 332, and the drive range are designed so that the relationship between the voltage applied to the coil 331 and the moving distance of the collimator lens 15 can be expressed by a linear function. Therefore, the variation of the movement amount of the collimator lens 15 can be corrected by calculating the relational equation (1) described above. Further, in this structure, because the correction process portion 211 can easily calculate the relational equation between the drive voltage and the movement amount of the collimator lens 15 (moving distance), it is possible to shorten time necessary for calculating the relational equation.

Further, the present invention can also be applied to the lens driving device (optical pickup) having a structure in which the relationship between the voltage applied to the coil 331 (drive voltage) and the moving distance of the collimator lens 15 cannot be expressed by a linear function in the drive range of the collimator lens 15, In this case, for example, the maximum and minimum drive limit voltages are determined similarly to the case described above, and an appropriate relational equation (that is not a linear function) should calculated in consideration of a variation of the counter electromotive force.

In addition, in the structure described above, the collimator lens 15 is moved to a vicinity of an end in the drive range, and then the drive voltage is increased step by step. However, without limiting to this structure, it is possible to adopt a structure in which the drive voltage is increased or decreased step by step from the neutral position so that a voltage value to reach the limit in the drive range is determined However, the structure described above is preferred because the detection of the voltage value to reach the limit in the drive range can be completed in short time.

In addition, the above-mentioned function of correcting the variation of the movement amount of the collimator lens 15 so as to improve position accuracy of the collimator lens 15 can be applied not only to the lens driving device of the third embodiment but also to the lens driving device of the first embodiment or the second embodiment, for example. Further, when applying to the lens driving device of the first embodiment, it is sufficient that the above-mentioned process for determining the drive limit voltage value is performed only for one of the ends in the drive range.

<Lens Driving Device of Fifth Embodiment>

Next, the lens driving device of a fifth embodiment is described. A structure of the lens driving device of the fifth embodiment is generally the same as the structure of the lens driving device of the third embodiment. Hereinafter, portions different from the third embodiment are mainly described. Further, the same part as in the third embodiment is denoted by the same numeral, and overlapping description thereof is omitted unless otherwise necessary.

The lens driving device 30 of the fifth embodiment has a structure in which an electromagnetic force generated by the coil 331 and the magnet 332 that are disposed and fixed to separate members is used for moving the collimator lens 15 in the optical axis direction. This lens driving device 30 is apt to have a weaker force (drive force) for moving the lens (lens holder) than the conventional lens driving device in which a stepping motor is used for moving the lens. Therefore, foreign matter such as dust may be sandwiched between the guide shaft 32 and the bearing 31b of the lens holder 31 and may cause a situation in which the collimator lens 15 does not move as intended (drive abnormality) despite that the coil 331 is applied with a voltage. The lens driving device 30 of the fifth embodiment is disposed so as to detect such drive abnormality and further to resolve such drive abnormality. Hereinafter, this structure is described.

Figure 18:
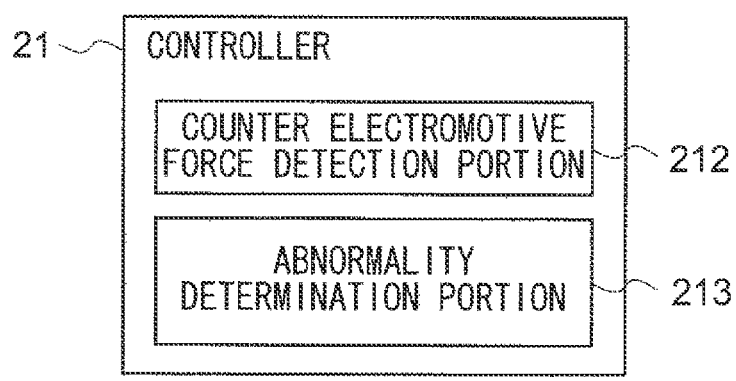
FIG. 18 is a diagram for explaining a structure of a controller included in a lens driving device according to a fifth embodiment of the present invention.

The controller 21 for controlling the drive of the lens driving device 30 includes the counter electromotive force detection portion 212 having a function to detect the counter electromotive force generated by drive of the drive portion 33 as illustrated in FIG. 18.

When the drive portion 33 is driven (to apply a voltage to the coil 331), the magnet 332 fixed to the lens holder 31 is moved. Therefore, according to the Lenz's law, the counter electromotive force e is generated (e=Bvl, B is a magnetic flux density of the magnet 332, v is a moving speed of the magnet 332, and l is an effective length of the coil 331). The counter electromotive force detection portion 212 can detect this counter electromotive force (reverse voltage). The counter electromotive force can be determined on the basis of a difference between the drive voltage value applied to the coil 331 and an actually measured voltage value, for example. When the drive voltage is given, if the counter electromotive force detection portion 212 detects the counter electromotive force, it can be determined that the collimator lens 15 has moved. If the counter electromotive force is not detected (if the counter electromotive force is zero), it can be determined that the collimator lens 15 has not moved.

The controller 21 includes an abnormality determination portion 213 having a function of determining whether or not there is an abnormality in the drive of the collimator lens 15 (drive abnormality) (see FIG. 18). The abnormality determination portion 213 determines that there is a drive abnormality if it is determined that the collimator lens 15 has not moved on the basis of information from the counter electromotive force detection portion 212 despite that the drive portion 33 is driven under a specific condition (that will be apparent from the later description). In addition, when it is determined that there is a drive abnormality, the abnormality determination portion 213 controls the lens driving device 30 to perform an abnormality removing operation for restoring from the abnormal state to the normal state.

In this embodiment, for example, when the optical pickup 1 (lens driving device 30) is powered on, and/or before information is read from the optical disc (or information is written on the optical disc) by using the optical pickup 1, it is determined whether or not there is a drive abnormality. Further, the process of checking whether or not there is a drive abnormality may be performed not only at the timing of this embodiment but also at other timing. In addition, this checking process may be performed together with other process such as a process for checking the drive limit position of the lens driving device 30.

Figure 19:
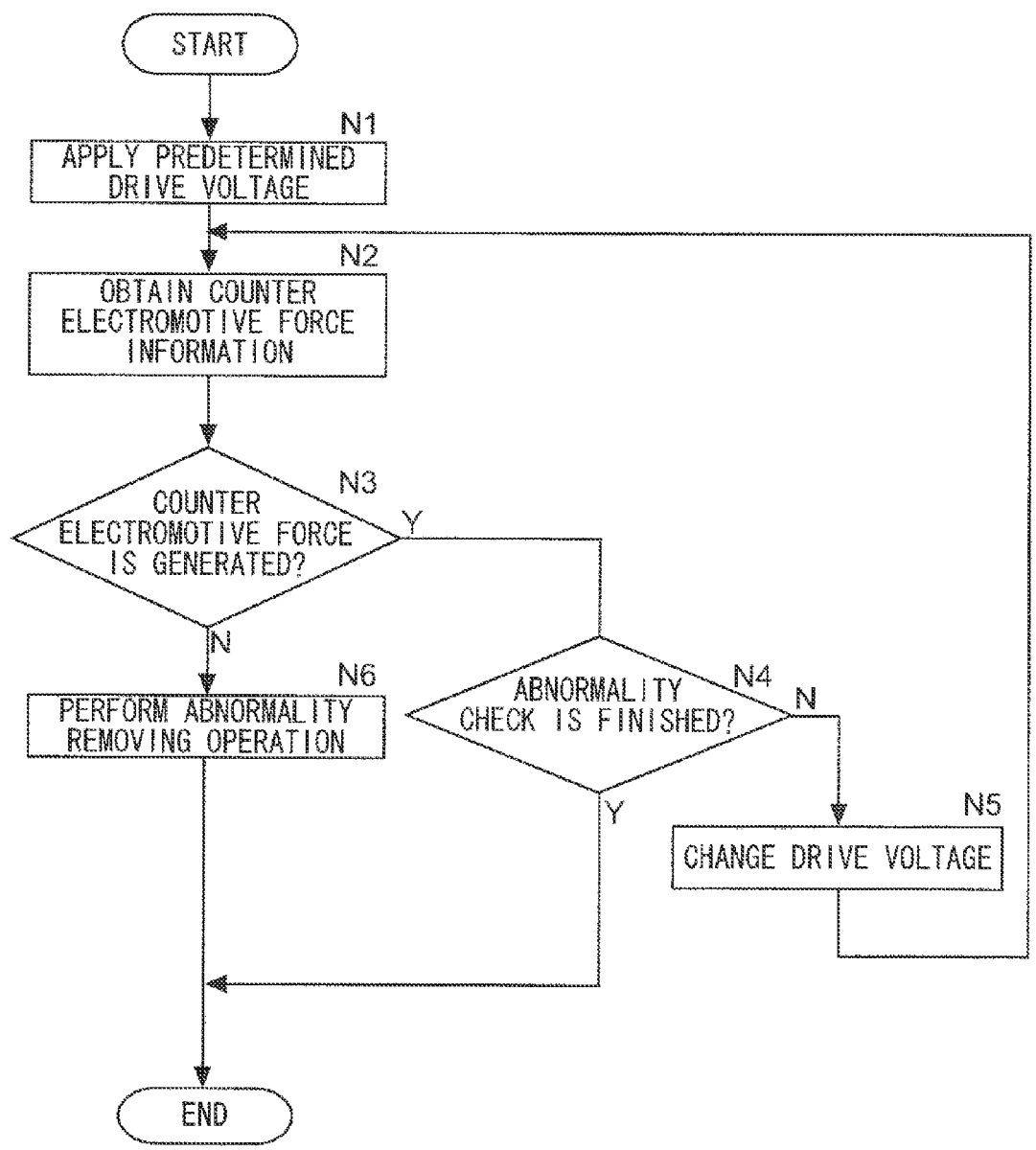
FIG. 19 is a flowchart illustrating a process flow that is performed for checking presence or absence of a drive abnormality in the lens driving device according to the fifth embodiment of the present invention.
Figure 20:
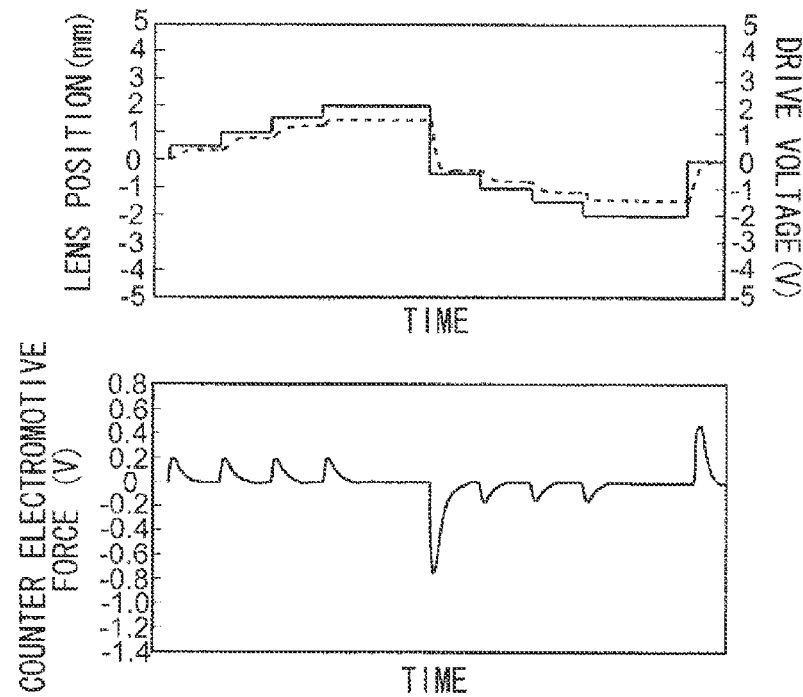
FIG. 20 is a graph indicating temporal changes of a collimator lens position, a voltage applied to the coil (drive voltage), and a counter electromotive force during a period while the process for checking (presence or absence of a drive abnormality) is being performed in the lens driving device according to the fifth embodiment of the present invention, and is a graph in a case where no drive abnormality occurs.
Figure 21:
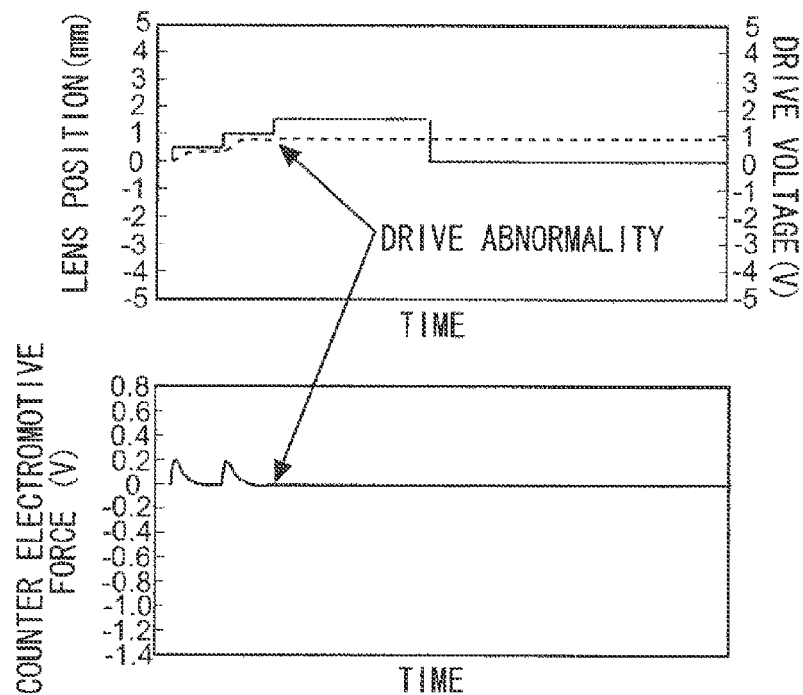
FIG. 21 is a graph indicating temporal changes of a collimator lens position, a voltage applied to the coil (drive voltage), and a counter electromotive force during a period while the process for checking (presence or absence of a drive abnormality) is being performed in the lens driving device according to the fifth embodiment of the present invention, and is a graph in a case where a drive abnormality has occurred.

FIG. 19 is a flowchart illustrating a process flow of checking whether or not there is a drive abnormality in the lens driving device 30 according to the fifth embodiment of the present invention. With reference to FIG. 19, the process flow of checking whether or not there is a drive abnormality is described below. Further, in this description, FIGS. 20 and 21 are also referred to as necessary. FIGS. 20 and 21 are graphs showing temporal changes of a position of the collimator lens 15, the voltage applied to the coil 331 (drive voltage), and the counter electromotive force, during a period while the checking process (for checking whether or not there is a drive abnormality) is being performed in the lens driving device 30 according to the fifth embodiment of the present invention. FIG. 20 is a graph in a case where there is no drive abnormality, FIG. 21 is a graph in a case where there is a drive abnormality. Further, in the graphs in an upper side of FIGS. 20 and 21, a solid line indicates a temporal change of the drive voltage, and a broken line indicates a temporal change a position of the collimator lens 15.

As illustrated in FIG. 19, first, according to an instruction of the abnormality determination portion 213, a predetermined drive voltage is applied to the coil 331 (Step N1). It is checked whether or not the drive abnormality is generated in the normal operation range of the collimator lens 15. Here, the normal operation range is a range set to be narrower than the movable range of the collimator lens 15 (the maximum movable range described above), and is an operation range necessary for achieving a desired purpose (which is correction of spherical aberration in this embodiment).

As described above, because it is necessary to check there is a drive abnormality in the normal operation range, the predetermined drive voltage is a voltage value such that the collimator lens 15 is not outside the normal operation range. Here, there may occur a situation where a drive abnormality is not generated if an absolute value of the drive voltage is large, but it is generated if the absolute value of the drive voltage is small. In view of this point, the above-mentioned predetermined drive voltage is set to a voltage value having a small absolute value without exceeding the end of the normal operation range. Further, as clarified from the following description, the above-mentioned predetermined drive voltage is then changed step by step to a voltage having a large absolute value while it is checked whether or not there is a drive abnormality. In addition, in the example illustrated in FIGS. 20 and 21, the predetermined drive voltage is set to 0.5 V.

When the predetermined drive voltage is applied, the abnormality determination portion 213 acquires information about the counter electromotive force from the counter electromotive force detection portion 212 (Step N2). Then, the abnormality determination portion 213 checks whether or not the counter electromotive force is generated when a predetermined drive voltage is applied (Step N3). If the counter electromotive force is generated (if the counter electromotive force is not zero, namely Yes in Step N3), the abnormality determination portion 213 determines that the collimator lens 15 has normally moved so that there is no drive abnormality. Then, abnormality determination portion 213 checks whether or not the abnormality checking process is finished (Step N4).

In the structure of this embodiment, the process of checking abnormality is finished when the collimator lens 15 is moved from the one end to the other end in the normal operation range. The determination whether or not the collimator lens 15 has moved to the end in the normal operation range is performed on the basis of a voltage value applied to the coil 331. In other words, a threshold value for this determination is stored in a memory (not shown). Further, in this embodiment, the neutral position of the collimator lens 15 (position in a state to which the drive voltage is not applied) is a vicinity of the midpoint in the normal operation range (corresponding to a vicinity of the midpoint in the maximum movable range). Therefore, the abnormality checking process is finished when the collimator lens 15 is moved from the neutral position to the one end in the normal operation range and then moved to the other end (see FIG. 20).

If it is determined that the abnormality checking process is not finished (No in Step N4), the drive voltage value is changed (Step N5). If the collimator lens 15 that has moved from the neutral position to the one end in the normal operation range has not reached the one end, a predetermined voltage (absolute value) is added so that the absolute value of the drive voltage applied at that time point is raised. If the collimator lens 15 has reached the one end in the normal operation range, the drive voltage is changed so that the collimator lens 15 moves from the neutral position to the other end in the normal operation range. If the collimator lens 15 that has moved from the neutral position to the other end in the normal operation range has not reached the other end, a predetermined voltage (absolute value) is added so that the absolute value of the drive voltage applied at that time point is raised.

Further, in FIGS. 20 and 21, the above-mentioned predetermined voltage (absolute value) is 0.5 V. In addition, the voltage applied first when the direction of moving the collimator lens 15 is changed to the direction toward the other end in the normal operation range is −0.5 V. The voltage value when the collimator lens 15 reaches the one end in the normal operation range is 2 V, and the voltage value when the collimator lens 15 reaches the other end is −2 V. However, these values are merely examples, which can be changed as necessary.

When the drive voltage value is changed, the process returns to Step N2 in which it is checked whether or not there is a drive abnormality at each changed drive voltage. If there is no drive abnormality (in the case of FIG. 20), there is not a state where the counter electromotive force is not generated in Step N3. Therefore, the abnormality determination portion 213 does not detect an abnormality.

On the other hand, if there is a drive abnormality, there is a state where the counter electromotive force is not generated in Step N3 (No in Step N3). For instance, when the drive voltage is changed from 1 V to 1.5 V in FIG. 21, the counter electromotive force is not generated. If the counter electromotive force is not generated, it is determined that the collimator lens 15 has not moved. Therefore, the abnormality determination portion 213 determines that there is a drive abnormality and performs the abnormality removing operation (Step N6). Further, the abnormality determination portion 213 may perform a process of stopping application of the voltage to the coil 331 when a drive abnormality is detected, or may perform the abnormality removing operation without performing the process of stopping application of the voltage in particular. In FIG. 21, the process of stopping application of the voltage is temporarily performed.

The abnormality removing operation is not limited to a particular operation as long as it is an operation for restoring from the abnormal state to the normal state. In this embodiment, supposing that a drive abnormality is caused usually when foreign matter (such as dust) is sandwiched between the guide shaft 32 and the bearing 31*b*, the following operation is performed.

Specifically, the abnormality determination portion 213 applies a large drive voltage to the coil 331 as the abnormality removing operation. This drive voltage is a voltage larger than a maximum absolute value of a voltage necessary for moving the collimator lens 15 to the ends (two ends) in the normal operation range (2 V in the example illustrated in FIG. 20). For instance, a voltage (limit voltage) for reaching the end in the movable range (maximum movable range) is applied. This limit voltage may be a voltage that is stored in advance or a voltage that is updated later.

Figure 22:
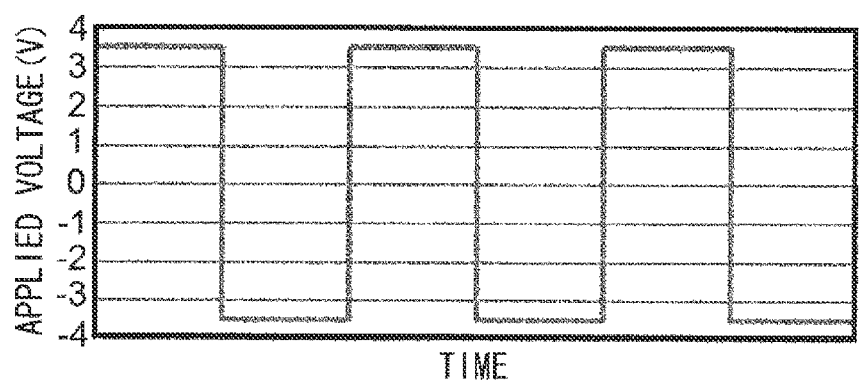
FIG. 22 is a graph for explaining an abnormality removing operation performed by the lens driving device according to the fifth embodiment of the present invention.

Further, as illustrated in FIG. 22, it is possible to change a sign of the limit voltage (having an absolute value of 3.5 V, for example) every predetermined time and to apply the coil 331 with a voltage aimed so that the collimator lens 15 (lens holder 31) moves in a reciprocating manner (moves alternately in the first direction and in the second direction opposite to the first direction). In this case, a target of the number of the reciprocating movement may be one time or a plurality of times. In this way, by applying the coil 331 with the drive voltage aimed at moving the collimator lens 15 in a reciprocating manner, probability of removing the foreign matter can be increased.

Figure 23:
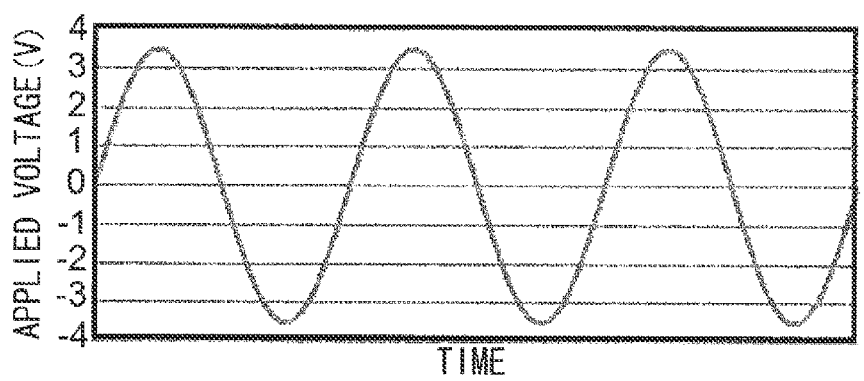
FIG. 23 is a graph for explaining an abnormality removing operation performed by the lens driving device according to the fifth embodiment of the present invention, and is a diagram for explaining a first variation example of a pattern illustrated in FIG. 22.
Figure 24:
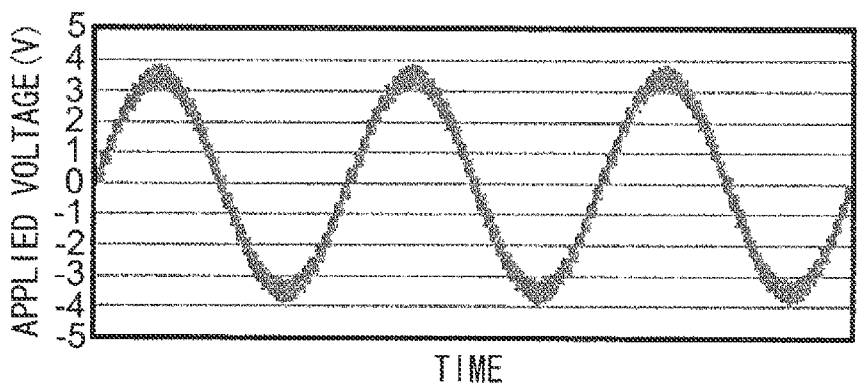
FIG. 24 is a graph for explaining an abnormality removing operation performed by the lens driving device according to the fifth embodiment of the present invention, and is a diagram for explaining a second variation example of the pattern illustrated in FIG. 22.

Further, the applied voltage has a pattern of a rectangular wave in FIG. 22, but this is not a limitation. For instance, it is possible to adopt a sine wave as illustrated in FIG. 23. In addition, when the voltage having a pattern as illustrated in FIG. 22 or 23 aimed at the reciprocating movement of the collimator lens 15, it is possible to apply the voltage while superimposing an AC (alternating) voltage having a high frequency (for example, a few hundreds to a few thousands Hz order) (see FIG. 24). Thus, a force is given so that the lens holder 31 (collimator lens 15) can perform fine vibration, and hence probability of removing the foreign matter can be increased. Further, FIG. 24 illustrates the structure in which the high frequency AC voltage is superimposed to the sine wave. As a matter of course, it is possible to superimpose the high frequency AC voltage to a rectangular wave as illustrated in FIG. 22. In addition, it is possible to adopt a structure in which the AC component is superimposed to a constant DC voltage in a certain case.

As described above, according to this embodiment, a drive abnormality of the lens driving device 30 can be detected. Further, when a drive abnormality is detected, it is possible to remove a cause of the abnormality. Therefore, according to this embodiment, a stable operation of the optical pickup 1 and the lens driving device 30 can be expected. In addition, because of the structure in which the counter electromotive force is used for detecting a drive abnormality, it is not necessary to add another sensor or the like for detecting a drive abnormality. Thus, the lens driving device 30 of this embodiment is advantageous in cost reduction and downsizing.

In the structure described above, a drive abnormality is detected when the counter electromotive force to be generated is not generated. However, the present invention is not limited to this structure. It is possible to adopt a structure in which it is determined that the drive abnormality has occurred if a pattern of the detected counter electromotive force is a pattern other than expected.

In addition, in the structure described above, it is detected whether or not there is a drive abnormality before the optical pickup 1 reads information. However, the present invention can also be applied to a structure in which a drive abnormality is detected also while the optical pickup 1 is reading information.

In addition, the above-mentioned function for detecting a drive abnormality and function for resolving the drive abnormality can be applied not only to the lens driving device of the third embodiment but also to the lens driving devices of the first embodiment and the second embodiment, for example.

<Others>

The embodiments described above are merely examples of the present invention, and an application range of the present invention is not limited to the structures of the embodiments.

For instance, in the structures of the embodiments described above, the elastic portions 34, 36, and 37 can apply the lens holder 31 with forces in three directions that are perpendicular to each other. However, it is possible to adopt another structure in which only forces in two direction perpendicular to each other (for example, X direction and Y direction) can be applied to the lens holder 31 in a certain case. It is preferred that the elastic portion included in the lens driving device 30 can supply the lens holder 31 with a force in a direction parallel to the optical axis direction of the lens 15 (guide shaft 32), a force in a direction perpendicular to the optical axis of the lens 15 (guide shaft 32), and a force in a direction to rotate the lens holder 31 about the guide shaft 32.

In addition, the lens driving device 30 in the embodiments described above has a structure in which the coil 331 is fixed, and the magnet 332 moves (so-called a moving magnet type). However, an application range of the present invention is not limited to this. In other words, the present invention can be applied also to a lens driving device having a structure in which the magnet is fixed, and the coil moves (so-called a moving coil type). Further, in a certain case, the present invention can be applied also to a lens driving device using a motor as the drive source.

In addition, in the structure of the embodiments described above, the lens driving device 30 moves the collimator lens 15. However, the lens moved by the lens driving device 30 may be a lens other than the collimator lens (for example, a movable lens constituting an expander lens).

Other than that, the lens driving device of the present invention may be applied to an optical apparatus other than the optical pickup (for example, a camera).

What is claimed is:

1. A lens driving device comprising:
a lens;
a lens holder for holding the lens;
a shaft for supporting the lens holder, the lens holder being movable in a direction parallel to an optical axis direction of the lens;
a drive portion for driving the lens holder; and
an elastic member disposed diagonally to a direction parallel to the shaft, the elastic member pulling the lens holder and thereby applying to the lens holder a force acting in such a direction as to press the lens holder onto the shaft.

2. The lens driving device according to claim 1, further comprising
one of a groove rail and a convex rail for supporting the lens holder, the lens holder being movable in the direction parallel to the optical axis direction of the lens.

3. The lens driving device according to claim 1, wherein the drive portion includes a coil and a magnet for driving the lens holder by an electromagnetic force, and one of the coil and the magnet is mounted on the lens holder.

4. The lens driving device according to claim 1, wherein the elastic member is diagonal to the direction parallel to the shaft when the elastic member is in a neutral position in which the force in the direction parallel to the shaft is not applied to the lens holder.

5. The lens driving device according to claim 1, further comprising:
a movement detection portion capable of detecting whether or not the lens held by the lens holder has at least moved; and
a correction process portion for changing a drive set value of the drive portion step by step at a predetermined timing so as to calculate an association relationship between a drive set value of the drive portion and a movement amount of the lens on the basis of a detection result detected by the movement detection portion on the basis of the change.

6. The lens driving device according to claim 5, wherein the movement detection portion detects whether or not the lens has at least moved by using a counter electromotive force generated by drive of the drive portion.

7. The lens driving device according to claim 5, wherein the correction process portion calculates a linear expression to be used for determining the drive set value of the drive portion on the basis of a movable range of the lens and a detection result by the movement detection portion.

8. An optical disc apparatus comprising:
the lens driving device according to claim 1; and
an optical pickup including the lens driving device.

9. The optical disc apparatus according to claim 8, wherein
the optical pickup includes a light source, and an objective lens for condensing light emitted from the light source onto an information recording layer of the optical disc, and
the lens held by the lens holder is a collimator lens disposed between the light source and the objective lens in an optical path.

10. A lens driving device comprising:
a lens;
a lens holder for holding the lens;
a supporter portion for supporting the lens holder in a movable manner, the supporter portion extending in a direction parallel to an optical axis direction of the lens held on the lens holder;
a drive portion for driving the lens holder;
an elastic portion for supplying the lens holder with a force in a predetermined direction;
a counter electromotive force detection portion for detecting a counter electromotive force generated by drive of the drive portion; and
an abnormality determination portion for determining whether or not there is an abnormality in drive of the lens held by the lens holder on the basis of the counter electromotive force detected by the counter electromotive force detection portion, wherein
the supporter portion includes a shaft engaging with a bearing of the lens holder and one of a groove rail and a convex rail engaging with a part of the lens holder,
the force in a predetermined direction includes a force in a direction perpendicular to the shaft, a force in a direction to rotate the lens holder about the shaft, and a force in a direction parallel to the shaft,
the drive portion includes a coil and a magnet for driving the lens holder by an electromagnetic force, and one of the coil and the magnet is mounted on the lens holder,
a normal operation range of the lens is set narrower than the movable range of the lens, and
the abnormality determination portion determines that there is an abnormality in the drive of the lens if it is determined that the lens has not moved on the basis of the counter electromotive force despite that a drive force in the normal operation range is given by the drive portion.

11. The lens driving device according to claim 10, wherein the abnormality determination portion makes to perform an abnormality removing operation for restoring from the abnormal state to a normal state when it is determined that there is the abnormality.

12. The lens driving device according to claim 11, wherein the abnormality removing operation includes an operation to supply the coil with a voltage having an absolute value larger than an absolute value of a voltage necessary for moving the lens to an end portion in the normal operation range.

13. The lens driving device according to claim 11, wherein the abnormality removing operation includes an operation to apply a voltage to the coil so that the lens moves at least one time each in a first direction and in a second direction opposite to the first direction.

14. The lens driving device according to claim 11, wherein the abnormality removing operation includes an operation to supply the coil with a voltage having a predetermined pattern in which an AC component is superimposed.

15. A lens driving device comprising:
a lens;
a lens holder for holding the lens;
a drive portion for driving the lens holder;
a counter electromotive force detection portion for detecting a counter electromotive force generated by drive of the drive portion; and
an abnormality determination portion for determining whether or not there is an abnormality in drive of the lens held by the lens holder on the basis of the counter electromotive force detected by the counter electromotive force detection portion, wherein
the drive portion includes a coil and a magnet for driving the lens holder by an electromagnetic force, and one of the coil and the magnet is mounted on the lens holder,
a normal operation range of the lens is set narrower than the movable range of the lens, and
the abnormality determination portion determines that there is an abnormality in the drive of the lens if it is determined that the lens has not moved on the basis of the counter electromotive force despite that a drive force in the normal operation range is given by the drive portion.

16. The lens driving device according to claim 15, wherein the abnormality determination portion makes to perform an abnormality removing operation for restoring from the abnormal state to a normal state when it is determined that there is the abnormality.

17. The lens driving device according to claim 16, wherein the abnormality removing operation includes an operation to supply the coil with a voltage having an absolute value larger than an absolute value of a voltage necessary for moving the lens to an end portion in the normal operation range.

18. The lens driving device according to claim 16, wherein the abnormality removing operation includes an operation to apply a voltage to the coil so that the lens moves at least one time each in a first direction and in a second direction opposite to the first direction.

19. The lens driving device according to claim 16, wherein the abnormality removing operation includes an operation to supply the coil with a voltage having a predetermined pattern in which an AC component is superimposed.

* * * * *